(12) United States Patent
Ferraro

(10) Patent No.: US 8,414,399 B2
(45) Date of Patent: Apr. 9, 2013

(54) USER VALUE TRANSPORT MECHANISM ACROSS MULTIPLE VIRTUAL WORLD ENVIRONMENTS

(75) Inventor: Enrique A. Ferraro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1014 days.

(21) Appl. No.: 12/144,295

(22) Filed: Jun. 23, 2008

(65) Prior Publication Data

US 2009/0319609 A1 Dec. 24, 2009

(51) Int. Cl.
*A63F 9/24* (2006.01)
(52) U.S. Cl. .......................................................... 463/42
(58) Field of Classification Search ...................... 463/42
See application file for complete search history.

(56) References Cited

U.S. PATENT DOCUMENTS

| | | | |
|---|---|---|---|
| 6,009,458 A * | 12/1999 | Hawkins et al. ............... | 709/203 |
| 7,003,586 B1 | 2/2006 | Bailey et al. | |
| 7,101,284 B2 | 9/2006 | Kake et al. | |
| 7,115,034 B2 | 10/2006 | Kuwahara | |
| 7,677,979 B2 * | 3/2010 | Van Luchene ................... | 463/42 |
| 7,870,074 B2 * | 1/2011 | Amsterdam et al. ............ | 705/51 |
| 2001/0005689 A1 * | 6/2001 | Fujioka et al. ..................... | 463/4 |
| 2006/0234795 A1 * | 10/2006 | Dhunjishaw et al. ........... | 463/42 |
| 2007/0021200 A1 * | 1/2007 | Fox et al. .......................... | 463/30 |
| 2007/0111770 A1 * | 5/2007 | Van Luchene ..................... | 463/7 |
| 2007/0129126 A1 * | 6/2007 | Van Luchene ..................... | 463/1 |
| 2007/0168214 A1 | 7/2007 | Jung et al. | |

FOREIGN PATENT DOCUMENTS

GB 2337404 A 11/1999

OTHER PUBLICATIONS

Metroid, Copyright 1986, Published by Nintendo.*
AccountGear.com, as stored by the Internet Archive (Archive.org) on Oct. 11-Nov. 15, 2007; accessed Apr. 21, 2011.*
Kirner et al., "Simulation of Real-Time Systems: An Object-Oriented Approach Supported by a Virtual Reality-Based Tool", Proceedings of the 38th Annual Simulation Symposium (ANSS'05), 8 pages.
Vanderdonckt et al., "Model-based Design, Generation, and Evaluation of Virtual User Interfaces", ACM, 2004. pp. 51-60.
Doppke et al., "Software Process Modeling and Execution within Virtual Environments", ACM Transactions on Software Engineering and Methodology, vol. 7, No. 1, Jan. 1998, pp. 1-40.

* cited by examiner

*Primary Examiner* — Omkar Deodhar
(74) *Attorney, Agent, or Firm* — Stephen J. Walder, Jr.; John D. Flynn

(57) ABSTRACT

Mechanisms for transferring a value associated with a representation of a user in a first virtual world environment instance to a second virtual world environment instance are provided. With these mechanisms, a request to transport a first representation of the user from the first virtual world environment instance to the second virtual world environment instance is received. One or more data objects associated with a first representation of the user in the first virtual world environment instance are quantized into at least one quantized value. The at least one quantized value is transported to the second virtual world environment instance and is converted into a second representation of the user in the second virtual world environment instance, the second representation of the user being different from the first representation of the user in the first virtual world environment. The at least one quantized value may not maintain a correspondence between the at least one quantized value and the one or more data objects such that the one or more data objects cannot be automatically generated based on the at least one quantized value.

25 Claims, 13 Drawing Sheets

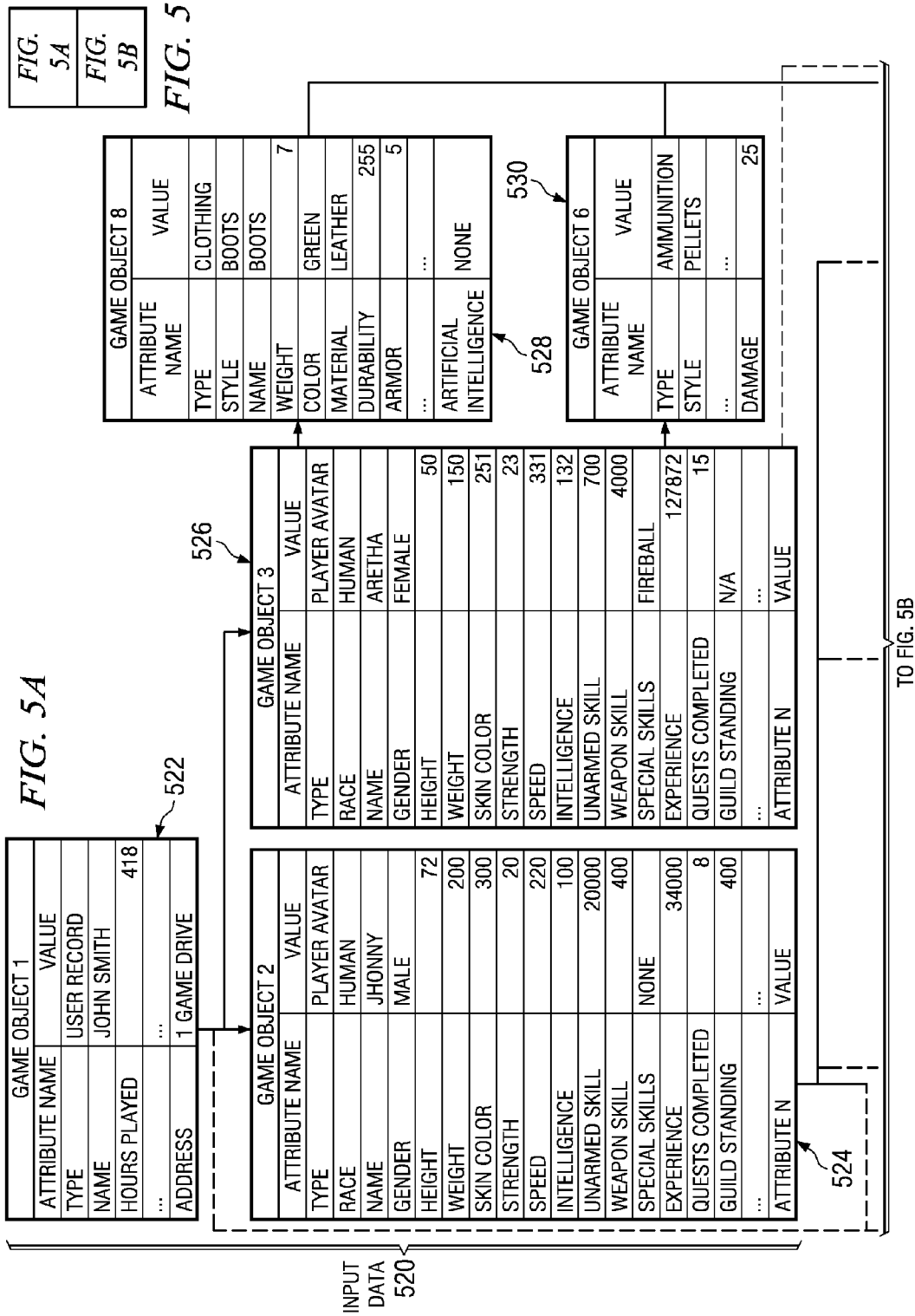

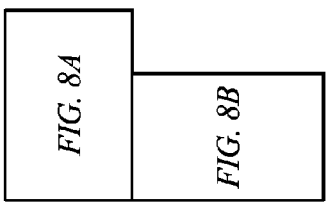
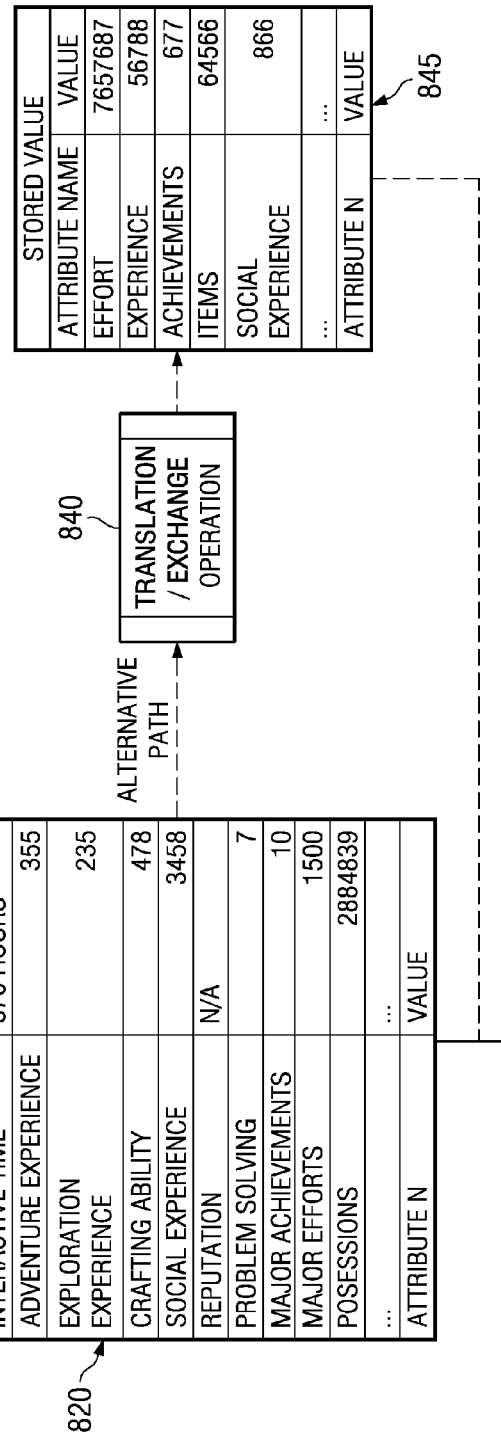

USER VALUE TRANSPORT MECHANISM ACROSS MULTIPLE VIRTUAL WORLD ENVIRONMENTS

BACKGROUND OF THE INVENTION

1. Field of the Invention

The present application relates generally to an improved data processing apparatus, method, and computer program product and more specifically to mechanisms for transporting user value across multiple virtual world environments.

2. Background of the Invention

Recently, with increased usage of data networks and the Internet, advancements have been made in representing virtual environments with which users of computing devices may interact through their computing devices. Many "virtual worlds" have been created in which users may have virtual representations of themselves that are able to interact with objects in the virtual world. These virtual representations of the users are generally referred to as avatars. These avatars may take many different forms from virtual human being representations, virtual non-human character representations, inanimate object representations, e.g., space ships or the like, etc. The types of avatars that may be provided for representing a user is generally dependent upon the type of virtual world in which the avatar is to be used.

For example, virtual worlds are often provided in the context of massively multiplayer online games (MMOG) or simply a MMO. A MMO is a video game which is capable of supporting hundreds or even thousands of players simultaneously. As such, MMOs are typically provided via a data network, such as the Internet, in which users of client computing devices communication with one or more server computing devices that provide the virtual world environment for the MMO. Examples of such MMO role playing games include World of Warcraft™, Everquest™, Eve Online™, Pirates of the Burning Seas™, PhantasyStar Online™, Second Life™, City of Heroes™, City of Villains™, and the like.

With such MMOs, users typically invest a large amount of time playing their avatars within the virtual world environment so as to increase the abilities of the avatars though the increasing of attributes of the avatars as well as acquiring virtual objects or items that provide increases, or even new, abilities of the avatars. For example, a user playing World of Warcraft™ may spend many hours, days, or even months, increasing his/her virtual character's, or avatar's, strength, magic ability, etc., and may perform various virtual "quests" to obtain virtual items, such as armor, weapons, magical items, or the like, that add to the virtual character's abilities within the World of Warcraft™ virtual world environment. Moreover, other more indirect attributes of the virtual avatar may be affected by the investment of time that the user makes in playing the virtual avatar within the virtual world environment, such as ranking within a clan, guild, or other association of user avatars, improvements made to virtual dwellings for the virtual avatar, etc. In short, with the increased popularity of virtual world environments, users are spending more time in these virtual world environments which represents an investment made by the users in their representations within these virtual world environments.

BRIEF SUMMARY OF THE INVENTION

In one illustrative embodiment, a method, in a data processing system, is provided for transferring a value associated with a representation of a user in a first virtual world environment instance to a second virtual world environment instance. The method may comprise receiving a request to transport a first representation of the user from the first virtual world environment instance to the second virtual world environment instance. The method may also comprise quantizing, in response to receiving the request, one or more data objects associated with a first representation of the user in the first virtual world environment instance into at least one quantized value. Moreover, the method may comprise transporting the at least one quantized value to the second virtual world environment instance and converting the at least one quantized value into a second representation of the user in the second virtual world environment instance, the second representation of the user being different from the first representation of the user in the first virtual world environment. The at least one quantized value may not maintain a correspondence between the at least one quantized value and the one or more data objects such that the one or more data objects cannot be automatically generated based on the at least one quantized value.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 5A and 5B are exemplary diagrams illustrating a quantization process in accordance with one illustrative embodiment;

FIGS. 8A and 8B are exemplary diagrams illustrating a de-quantization operation in accordance with one illustrative embodiment;

DETAILED DESCRIPTION OF THE INVENTION

Figure 1:
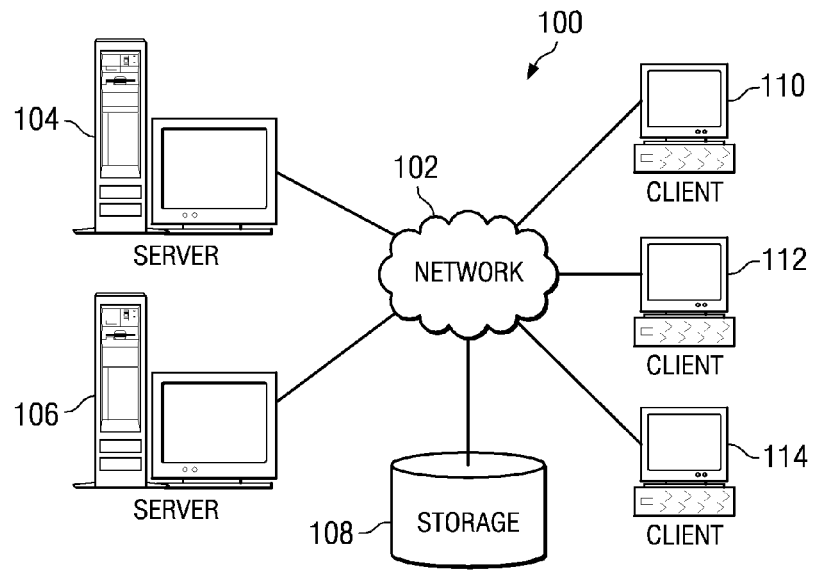
FIG. 1 is an exemplary diagram of a distributed data processing environment in which exemplary aspects of the illustrative embodiments may be implemented.

The illustrative embodiments provide a mechanism for transporting user value across multiple virtual worlds. As discussed above, with the increased popularity of the use of virtual worlds, such as in massively multiplayer online (MMO) games, non-gaming applications, and the like, users are investing more and more time in these virtual world environments leading to more and more state data for the virtual representations of the users in these virtual world environments. As MMO games and virtual worlds become more prevalent, users spend more of their time in these virtual world environments, and this state data is preserved for longer periods of time, users begin to assign increasing value to the skill demonstrated, efforts, and time expended in obtaining or being associated with their virtual representations in these virtual world environments and the state data generated and associated with these virtual representations, i.e. avatars. At the same time, the expectation that a user has with regard to the longevity, preservation and portability of this state data grows.

The ultimate concern of users is with the value that this state data represents for their virtual personas. Presently, users have no simple manner of capturing this value from one virtual world environment, or sometimes even one instance of a virtual world environment, and transporting it to another virtual world environment or another instance of the same virtual world environment. To the contrary, the user is trapped or locked-in to a particular virtual world environment instance by their very own perceived investment and achievements.

For example, a user may have invested tens or even hundreds of hours in creating and advancing a character, i.e. an avatar, in a virtual world environment, e.g., World of Warcraft™, and is not able to transfer that character and the character's objects to another virtual world environment, e.g., Everquest™ or even another instance of World of Warcraft™ on the same or different server computing device. As a result a user may be reluctant to eschew the investment that the user has made in that character and thus, is trapped or locked-in to continuing to spend time with that character in its original virtual world environment instance. Thus, the user's own investment of time becomes a source of frustration for the user.

One simple method for unlocking the value users have within a specific virtual world environment, or instance of a virtual world environment, and transporting it to another virtual world environment instance is to perform a sale for real world currency, e.g., U.S. dollars, Euros, Yen, etc., of all or part of the state data associated with the user's account in the virtual world environment or virtual world environment instance they wish to leave and perform a subsequent purchase (normally at an online auction house with payment via credit card or online payment system) of data and subsequent association to them at their destination virtual world environment instance. However, this methodology involves huge inefficiencies and present many potential problems, including possible theft. Therefore, for the most part, users, and even groups of users, e.g., guilds, clans, etc., remain locked-in to particular virtual world environments and instances.

In addition, for virtual world environments that preserve data elements for extended periods of time, an additional problem arises in the amount of state data being preserved. As users utilize various virtual world environment systems, the inventory of data they have associated with their virtual world personas, i.e. avatars, grows larger and larger. If users were allowed to simply migrate objects from one virtual world environment instance to another, e.g. if they were allowed to map a sword in one virtual world environment to a pistol in another virtual world environment, eventually the user would amass such a vast amount of data that it would become unmanageable. Virtual world systems constrain users with regard to the amount of state data they store for them allowing a user, for example, to be associated with a limited number of virtual objects within the virtual world environment. Thus, even though a user may have toiled to obtain his/her $201^{st}$ sword, he/she may not be able to keep it due to the system allowing a user to be associated with only 200 different swords.

In some virtual world environments, such as Sony's EverQuest™, users have been allowed to request that the virtual world system transport or even copy their state data between instances of the virtual world environment, or sometimes between releases of the virtual world environment, or into an instance that has modified rules of interaction. Due to the technical, coordination, and planning difficulties present-day transfers between virtual world instances amount to direct copying of data and occasionally discarding a portion of it. Since this is state data that a user of such a virtual world system assigns great emotional as well as material value to, and the objects themselves are very complex, this practice is not widespread.

With such mechanisms it is required that the data structures be functionally and sometimes structurally identical on the sending and receiving ends of a state data migration for such virtual world instances or an extreme amount of coordination is required to develop a mapping between the properties and values received and the functionality they will deliver at the receiving end of the state data transfer. To illustrate the complexity of such a mapping, consider a chess game that may use 32 gaming objects. With virtual world systems, such as virtual world gaming systems, these multiplayer environments often utilize gaming objects that number in the hundreds of thousands and sometimes millions. Moreover, whereas the game of chess utilizes on a handful of game objects that are significantly different from each other, e.g., rook, pawn, king, etc., a MMO game normally handles thousands of very different objects, e.g., pistols, boots, cars, swords, etc. Furthermore, while each game object in a game of chess behaves much in the same way as other similar pieces, e.g., a pawn is always a pawn, the objects in MMO games often have internal attributes that alter the way the object behaves, e.g., enchanted sword, helmet of strength, extra-durable boots, etc., and may even have programs attached to them making direct cross-virtual world portability practically impossible.

Add to these many different issues with regard to migration of a user's avatar from one virtual world instance to another, the fact that different virtual world instances often have different established economies, availabilities of in-world objects, and the like, and the problem gets even more complex. Furthermore, if the virtual world instances represent two completely different virtual world environments, e.g., City of Heroes™ having a modern city environment with superheroes as avatars versus World of Warcraft™ which uses a more medieval environment with fantasy creatures as avatars such as elves, taurons, etc., then objects cannot simply migrated and forms of currency cannot simply be copied over from one virtual world environment to the other.

Thus, having a movement methodology and mechanisms for implementing this methodology for moving or mapping state data associated with a user's avatar in one virtual world environment instance to another virtual world environment instance, such that it preserves the value a user perceives from the avatar, its attributes, and its acquired objects, is an extremely complex task even among just two virtual world environment systems. With three or even more different virtual world environment systems involved, the complexity of the migration or mapping strategies among these systems quickly grows unmanageable. Currently, there are over a hundred MMO games with persistent virtual world environments, each using different data formats for storing the state data for avatars in these virtual world environments. Creating a single format for state data is practically impossible due to the very diverse virtual world environments these systems represent. Moreover, creating mapping or migration strategies to interoperate among these MMO game systems, each with thousands of different types of virtual objects would entail an immense effort.

The mechanisms of the illustrative embodiments implement a methodology for quantizing the user's perceived value of an avatar, its attributes, and its acquired objects, in-world associations, and the like. This quantization process coalesces complex virtual world environment state data into one or more user values. These user values are provided to an externalization mechanism that permits these one or more user values to be used to obtain a representation of the user within another virtual world environment, e.g., a new avatar in another virtual world environment, or the enhance an already existing user representation within the virtual world environment. An acceptance mechanism is provided for receiving data from the externalization mechanism and converting it to a format readable by the receiving virtual world environment system. A de-quantization mechanism is provided for taking the quantized user values that have been externalized and provided to the receiving virtual world environment system and uses these values along with user input, system rules, system constraints, and the like, to interactively assist a user with creating a new representation, e.g., avatar, within the new virtual world environment system. The acceptance and de-quantizing mechanisms may together represent an internalization mechanism for internalizing the externalized data from the first virtual world environment system into the new or second virtual world environment system.

A data pooling mechanism may be provided for controlling the growth of virtual environments by tracking user claims to externalized values. The data pooling mechanism may act as a type of "bank" for externalized user valuations of their virtual world environment avatars. A data clearance mechanism is provided that operates on two or more data pools for enabling movement of externalized user values from data pool to data pool. The data clearance mechanism may use unclaimed inventory and/or over commitment of claims to enable the partial or total movement of claims from one pool to another. These various mechanisms will be described in greater detail hereafter.

Since the mechanisms of the illustrative embodiments are directed to virtual world environments which typically are provided for use by a large number of users situated geographically, in a dispersed manner, the mechanisms of the illustrative embodiments are especially well suited for use with a distributed data processing system in which a plurality of client computing devices may communicate with one or more server computing devices via one or more data networks. Thus, FIGS. 1-2 will be provided hereafter as examples of a distributed data processing environment and a data processing device in which aspects of the illustrative embodiments may be implemented. It should be appreciated, however, that the mechanisms of the illustrative embodiments may alternatively be implemented in a stand-alone computing device as well without departing from the spirit and scope of the present invention. However, for purposes of the following description, it will be assumed that the mechanisms of the illustrative embodiments are implemented in one or more computing devices of a distributed data processing environment.

Figure 2:
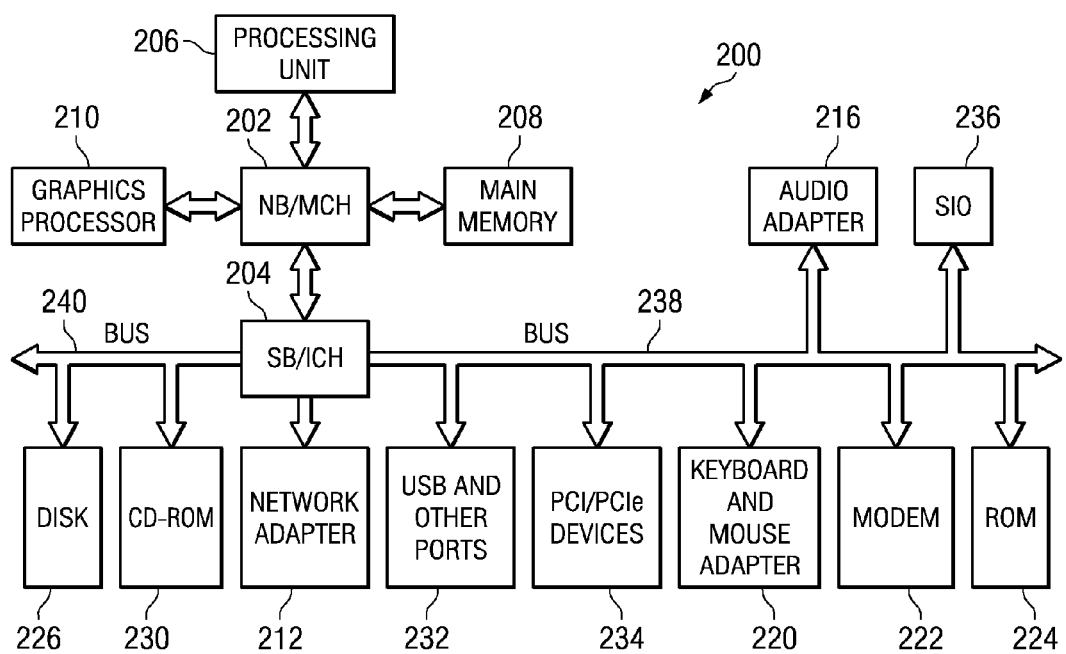
FIG. 2 is an exemplary block diagram of a data processing device in which exemplary aspects of the illustrative embodiments may be implemented.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System P® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Referring again to FIG. 1, the servers 104 and 106 may represent single server computing devices, clusters or groups of server computing devices, or the like. As such, these server computing devices 104 and 106 may provide virtual world environment instances with which users of client devices 110, 112, and 114 may interact via client applications running on these client devices 110, 112, and 114. It should be noted that while only two servers 104 and 106 are shown in FIG. 1, and only three client devices 110, 112, and 114 are shown, in actuality there may be many hundreds, thousands, or even millions of client computing devices 110, 112, and 114 all interacting with hundreds or thousands of servers 104 and 106. The servers 104 and 106 may each provide a virtual world environment instance which may be of a same type of virtual world environment or different types of virtual world environments. For example, server 104 may provide a first massively multiplayer online (MMO) game environment instance and server 106 may provide a second MMO game environment instance. The first and second MMO game environments may be of a same MMO game, e.g., two different instances of the same game, or may be of different MMO games. For purposes of the following description, it will be assumed that the virtual world environment instances upon which the mechanisms of the illustrative embodiments operate are MMO game environment instances, although the present invention is not limited to gaming environments and may be equally applicable to any virtual world environment whether used for gaming purposes or any other purpose.

As discussed above, a user of a client device, such as client 110, may create an avatar within a first MMO game environment instance provided by server 104 and may interact with this first MMO game environment for a period of time to acquire various state data associated with that avatar. This state data may represent attributes, abilities, associations, acquired objects, etc. of the avatar which individually, and together, have a value to the user. The user, after a time, may decide that he/she wishes to spend time in another virtual world environment, such as in the second MMO game environment provided by server 106. However, the user has invested a large amount of time and effort in advancing his/her avatar in the first MMO game and does not wish to abandon the perceived value that the user has with regard to this avatar in the first MMO game. Thus, the user would like to be able to migrate this perceived value of the avatar in the first MMO game to a comparable value in the second MMO game such that a second avatar may be generated that has attributes, collected objects, associations, etc. that may be comparable to the first avatar within a tolerance allowed by the second MMO game environment. The illustrative embodiments provide such a mechanism that allows the migration of perceived value of virtual personas and objects from one virtual world environment instance to another without upsetting the already established virtual world environment instance's economy, object availability, etc. thereby minimizing any imbalance the introduction of the new avatar may cause.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
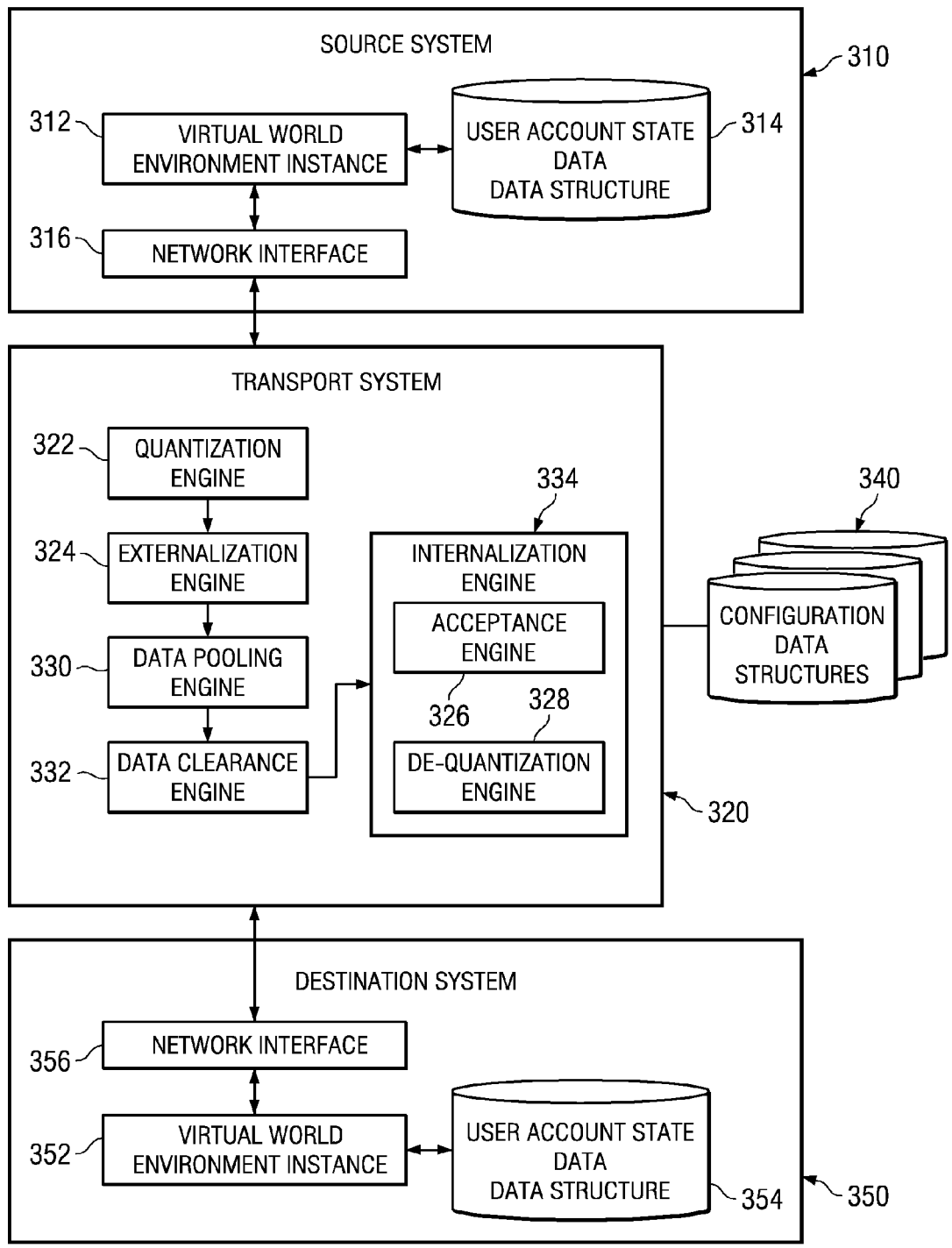
FIG. 3 is a block diagram of the primary operational components of a user value transport mechanism in accordance with one illustrative embodiment.

FIG. 3 is a block diagram of the primary operational components of a user value transport mechanism in accordance with one illustrative embodiment. The elements shown in FIG. 3 may be implemented in hardware, software, or any combination of hardware and software. In one illustrative embodiment, the elements shown in FIG. 3 are implemented as software executing on one or more data processing devices. Moreover, while a particular configuration of elements is shown in FIG. 3, the illustrative embodiments are not limited to the depicted configuration. Rather, elements shown as part of the transport mechanism 320 may be provided in one or more of the source system 310 or destination system 320. Some example alternative configurations will be provided in FIG. 12 hereafter to illustrate the versatility of the illustrative embodiments.

As shown in FIG. 3, a source system 310, e.g. a server, set of servers, or the like, may execute a virtual world environment instance 312, such as an instance of a massively multiplayer online (MMO) game environment, e.g., World of Warcraft™, EverQuest™, Pirates of the Burning Seas™, Eve Online™, or the like. A user may access this virtual world environment instance 312 via the network interface 316 through which the user may initiate a session with the virtual world environment instance 312 using client software for the virtual world environment running on the user's own client computing device (not shown). The user of the client computing device may interact with the virtual world environment instance 312 to generate an avatar, interact with virtual objects within the virtual world environment instance 312, and in so doing increase the abilities, associations, attributes, acquired objects, and the like, associated with the avatar. In this way, the user begins to associate a value with the avatar.

At some time later, the user may wish to start interacting with a different virtual world environment instance, such as may be provided by destination system 350, e.g., server, set of servers, or the like. However, the user does not wish to lose the perceived value associated with the avatar(s) in the first virtual world environment instance 312 by no longer being able to spend time with these avatar(s) in the first virtual world environment instance 312. Thus, the user may wish to migrate the perceived value of his/her avatar(s) in the first virtual world environment instance 312 to this new virtual world environment instance 352 executing on the destination system 350. However, the new virtual world environment instance 352 may have a different set of virtual objects, a different economy, or even a completely different environmental structure altogether, from that of the first virtual world environment instance 312. Thus, it is not possible to simply copy the state data in the user's account state data structures 314 to the new virtual world environment instance 352 and expect that it will be able to be used with this new virtual world environment instance 352. Moreover, providers of the destination server 350 and/or the virtual world environment instance 352 may prevent such direct copying of state data into their virtual world environment instance 352.

In order to facilitate a migration of the perceived value of the avatar(s) in the first virtual world environment instance 312 to the destination virtual world environment instance 352 of the destination system 350, the illustrative embodiments provide a user value transport mechanism 320 that converts the avatar(s) in the first virtual world environment instance 312 to a quantized value, externalizes that quantized value for use by the user and/or provider of a destination virtual world environment instance 352, and de-quantizes the value into avatar(s), attributes, virtual objects, etc., for the destination virtual world environment instance 352 while maintaining a balance of economies, objects, etc. in the destination virtual world environment instance 352. Various engines 322-334 are present in the user value transport mechanism 320 for facilitating these various operations of the user value transport mechanism 320, as described hereafter. It should be appreciated that while FIG. 3 depicts these engines 322-334 as all being part of a separate computing device, i.e. transport system 320, the illustrative embodiments are not limited to such. Rather, various ones and combinations of these engines 322-334 may be incorporated into the source server 310 and/or or destination system 350 without departing from the spirit and scope of the illustrative embodiments. For example, the quantization engine 322 and externalization engine 324 may be integrated into the source system 310 and the de-quantization engine 328 and internalization engine 334 may be integrated into the destination system 350. Moreover, the systems 310 and 350 may each be equipped with similar ones of these engines so that migration of user state data in both directions, i.e. from source to destination server and vice versa, is made possible.

The operation of these various engines 322-334 for specific virtual world environment instances 312 and 352 is configured using one or more configuration data structures 340 established for these virtual world environment instances. These configuration data structures 340 are preferably established by, or with the assistance of, the providers of the virtual world environment instances with which the configure data structure 340 is associated.

The quantization engine 322 determines a user value of user state data fed to the quantization engine 332 from the user account state data structure 314. This user state data may be fed to the quantization engine 322 in real time or in response to a user selection to feed the user's state data to the quantization engine 322. The quantization engine 322 coalesces the user state data into one or more quantized user values. These one or more quantized user values output by the quantization engine 322 may be added to, or subtracted from, the output of previous executions of the quantization engine 322 for that user, or for a group of users, such as a guild, clan, or the like.

The output of the quantization engine 322 represents the user's perceived value of his/her avatar, as quantized according to valuations agreed to by the provider of the virtual world environment instance. That is, configuration information including quantization rules for various attributes, associations, acquired objects, etc., may be established by a provider of the virtual world environment instance. These quantization rules may be generally applicable to all avatar elements or specific to individual attributes, associations, acquired objects, etc. of the avatars. For example, a quantization rule may take into account the various properties of an acquired object in generating a quantized value for that acquired object. The individual quantized values may be combined and coalesced into a single quantized valued for the avatar, or a set of quantized values for the avatar, e.g., a value for attributes of the avatar, a value for acquired objects of the avatar, a value for associations (such as a rank within a clan, guild, or the like), a value for particular experiences within the virtual world (such as quests completed within a virtual world environment instance), and the like. As one example, a quantization rule may generate a value for a sword acquired by an avatar based on the type of sword, damage rating of the sword, rarity value of the sword, any "magical" abilities of the sword, a durability rating of the sword, its relative ranking with regard to other swords within the virtual world environment instance, and other properties of the sword. There are many different types of quantization rules that may be established for quantizing the relative value of an avatar, all of which cannot be described herein but are intended to be within the spirit and scope of the illustrative embodiments.

The quantized value(s) output by the quantization engine 322 no longer have any attributes that uniquely identify them with specific source virtual world environment instance avatars, virtual objects, or the like. Thus, it is not possible to convert the quantized value(s) back into specific avatar attributes, associations, acquired objects, or the like, that generated the specific quantized value(s) without explicit user intervention.

To further explain this point, consider that a knight in the game of chess, due to its mobility and starting position on the chess board, may be quantized to the numerical value 23 according to the configuration rules provided in the configuration data structure 340. At the same time, a rook might also be quantized as the numerical value 23. The specific attributes of their movement, original location, and other attributes have been coalesced into a numerical value. It is not possible, given the numerical value 23, to determine whether that numerical value represents the knight or the rook. Furthermore, the user may present himself as having a total quantized value of 46, the addition of both coalesced numerical values 23. There is no way to determine the specifics of the game objects that were coalesced into this total quantized value. However, at de-quantization, alternatives may be presented for de-quantizing this total coalesced value into various game objects, e.g., three pawns and one knight, an increase of speed of an existing game object, a stack of 20 gold coins, extra playing time, etc.

The quantization engine 322 is further coupled to an externalization engine 324. The externalization engine 324 associates the output of the quantization engine 322 with the user, or a group of users, of the source system 310. The externalization engine 324 may format the output of the quantization engine 322 and provide additional information for describing the user, or group of users, and the association of the output data from the quantization engine 322 with the user or group of users so that an acceptance engine 326 associated with the destination system 350 can be engaged. The externalization engine 324 allows a user, other users, or a third party, to witness the data output by the quantization engine 322, e.g., the quantized value(s), and the data's relationship to a user or group of users. Moreover, the externalization engine 324 may allows a user or group of users to disassociate him/herself or themselves from at least part of the data produced by the quantization engine 322, for example if a portion of the quantized values has already been incorporated into a new virtual world environment instance but other portions of the quantized values still remain.

The externalization engine 324 may further allow a user, or group of users, to associate at least part of the data output by the quantization engine 322 to another user, or group of users, or even a third party. For example, if a user sells his quantization data to another user, the quantization data may be easily provided to another user via the externalization engine 324. Moreover, if the user joins a group of users, e.g., a guild, clan, or the like, then the user may associate his/her personal quantization value(s) with the group of users via the externalization engine 324. As a further example, the user may provide the quantization value(s) to a third party, such as third party individuals or groups of individuals (e.g., guilds, clans, etc.), other virtual worlds environment providers, or brokers and intermediaries, for example.

The externalization engine 324 is coupled to an acceptance engine 326 associated with a destination system 350. There may be many different acceptance engines 326 provided, one or more for each system that may accept externalized quantized values from the externalization engine 324. The acceptance engine 326 may receive data from the externalization engine 324 and may convert and store the received data into a format readable by the receiving destinations system 350. Moreover, the acceptance engine 326 may optionally notify the source system 310, in response to completion of the acceptance of the externalized data from the source system 310, that the data has been accepted and the acceptance process has been completed.

The acceptance engine 326 may be associated with a corresponding de-quantization engine 328 for the destination system 350. As with the acceptance engine 326, there may be multiple de-quantization engines 328, one or more for each system that may accept externalized quantized values from the externalization engine 324. The de-quantization function takes stored quantized user values along with user input, and system rules and constraints which may be provided in one or more configuration files of the configuration data structure 340, to interactively assist the user in creating new objects, avatars, or modifying attributes, values or the association of new or existing objects in the destination system 350.

The de-quantization engine 328 does not have specific knowledge of the attributes, associations, objects, and the like that were coalesced into the value(s) the user is presenting to the de-quantization engine 328. Therefore, the de-quantization engine 328 by itself cannot be used to migrate, translate, or map an avatar or associated virtual objects. The de-quantization engine 328 is used to finalize the transportation of a user's perceived value of their avatar or objects in the source system 310 to the destination system 350. The de-quantization engine 328 may present the user with interactive previews of the actions to be performed and the consequences of these actions should they be performed.

The acceptance engine 326 and the de-quantization engine 328 may be part of an internalization engine 334 associated with the destination system 350. The internalization engine 334 comprises the control logic for controlling the operation and interaction of the acceptance engine 326 and the de-quantization engine 328, as well as the logic necessary for providing user interfaces for the user to interact with the de-quantization engine 328 in order to finalize the transportation of the user's quantized value(s) into the destination system 350.

The user value transport mechanism 320 may further provide a data pooling engine 330 and a data clearance engine 332 which may work together to ensure proper balance of the user quantized data value being accepted into a destination system 350 with user quantized data value already present in the destination system 350 and flowing out of the destination system 350 to other systems as users migrate to other systems. Moreover, the data pooling engine 330 and data clearance engine 332 provide a mechanism for handling different levels of trust between source and destination systems, e.g., systems 310 and 350. The data pooling engine 330 operates as a "bank" of user quantized data values with the clearance engine 332 operating as a clearinghouse for the user quantized data values such that transfers of user quantized data values may be made between "pools" or "banks" for the various source and destination systems 310 and 350.

The data pooling engine 330 and data clearance engine 332 may operate in parallel with the externalization engine 324 and internalization engine 334. That is, the externalization engine 324 may externalize the user's quantized data value(s) such that they are pooled in the data pooling engine 330 for the user. The acceptance engine 326 may accept the user's quantized data value(s) from a pool of the data pooling engine 330 for the user associated with the destination system 350. This may involve a conversion process since there may be established exchange rates between user quantized data value(s) of different systems due to differences in the virtual world environment instances and their associated economies.

With the data pooling engine 330, a data pool is created by receiving quantized data value(s) from one or more users, source systems, or the like, and recording these quantized data value(s) in association with the identity of the user, a group of users, or the like. The data pool may further record the time, date, system, and location within the system and other information pertaining to the quantized data value(s) received and activities performed with regard to these quantized data value(s) or portions of these quantized data value(s).

In addition, a data pool of the data pooling engine 330 may record and track user quantized data value inventory and user claims against such pools of user quantized data value (s). This allows for the presence of unclaimed inventory, system-owned inventory, earned commissions, and generally inventory that does not have matching claims or inventory that is claimed by users, groups of users, or other entities that allow the system to operate more freely on those claims. These (as a group) allow an exchange system to operate without having to be tightly-couple the sending and receiving virtual world environment systems. Essentially the data pooling engine, operating as a third party, "owns" data on both the sending and receiving virtual world environment systems involved in the exchange, i.e. "system-owned inventory". When a user puts their data into a data pool, the data itself becomes merged with the "system-owned inventory" much like a bank. Thus, it is important to track which user(s) gave what data. More specifically, it is important to track "claims" against these data values. A claim allows a user to come back to the "bank," i.e. the exchange system, and request their data values back or request that they be exchanged. Once a user does request an exchange, the pooling system becomes imbalanced. The pooling system still has the data value(s) that the user that requested the exchange gave the pooling system.

This is similar, for example, to taking money to Western Union and sending it to another party in England. Even after paying out the money in England, Western Union still has the original money in the United States. Moreover, Western Union needed to have money in England to pay out to the party in England. Now Western Union has an imbalance it can clear through a foreign exchange market.

The pooling system of the illustrative embodiments, however, does not have that luxury since, in a sense, it is the "foreign exchange" system. The pooling system, after an exchange, will have a portion of data on the source pool that does not belong to any user of the pooling system, thus it belongs to the system, this is what is referred to herein as "unclaimed inventory," i.e. data inside a pool that is owned by the system but no user has a "claim" against it because the claim was destroyed when the user did the exchange.

On the other side of this exchange, we have a potential problem, i.e. over commitment. This is when the pooling system "gives out" more value than it actually has in the pool. Using over commitment for flexibility allows the exchange calculations to start sloping up the exchange rates and thus throttle values back and forth instead of halting the exchange into a particular virtual world. The aspect of data pool claims, over commitment, and the like, will be described in greater detail hereafter.

Each pool may record deposits, withdrawals, returns, delivery, usage, and alterations of user quantized data value(s) as well as redemptions and the grant of claims against such data value(s). In this way, the data pool may maintain a sort of ledger for the accumulation, usage, and transfer of data quantized value(s) for a user. Moreover, meta-pools, or "pools of pools" may be established for receiving and storing claims from other data pools and thereby providing for second degree claims. These second degree claims are claims into a set of one or more data pools as described above.

The data clearance engine 332 may operate on two or more data pools and uses unclaimed inventory of data quantized value(s) and/or over commitment of claims to enable the partial or total movement of claims from one pool to another. The term "unclaimed inventory" means stored user quantized value(s) inventory that does not have matching claims from users, or groups of users, or other entities, that allow the system to operate more freely on those claims. Typically, a system may have unclaimed inventory of user quantized data value(s) that may be used to allow new users to migrate into a system. The term "over commitment of claims" refers to an excess of claims over a limited inventory of user data quantized value(s).

To further explain the concept of over commitment of claims, consider an example in which three users on source system 310 present the data pooling system 330 with 50 sandals each (objects are used in this example, for illustrative purposes, but in actuality the data bank will typically only store data value(s) which may be correlated to a quantity of objects). The users are given a claim ticket that says "50 sandals." On Monday, a first user wants to go to destination system 350. This move is performed by looking at the pool of data that the destination system's pool has and it is determined that the destination system's pool has 200 socks that have been given by 10 users of the destination system 350. The 10 users of the destination system 350, and the two of the users of source system 310 have not asked to move any data beyond the pool itself, they just pooled the data.

Moving the first user on Monday means that the claim that was recorded for that first user is identified and destroyed in the first user's pool associated with the source system and, on the destination system's side, 15 socks are assigned to a destination system pool for the first user based on established rules. At this point in time, the destination system 350 has 10+1 users to which the destination system's pool owes something, i.e. each user has a claim to a portion of the destination system's data pool—10 users have claims for 20 socks each, and one user has a claim for 15 socks (he is the one that moved on Monday). There is a problem, however, in that the destination system's data pool does not have 215 socks but rather only 200. Thus, there is an over-commitment of claims against the destination system's data pool.

Now when that first user goes on to enjoy the socks, the destination system 350 will ask to let go of those 15 socks so that they can be actually given to the first user. After that, the first user enjoys the new virtual world environment instance provided by the destination system 350 and goes on his/her way. However, the destination system's data pool still has claims for 200 socks but only a remaining inventory of 185 socks. Thus, there is still an over-commitment. It is desirable to have an over-commitment but it is important to manage the amount of the over-commitment or, much like a financial bank, the moment the destination system's data pool cannot fulfill a request to release a portion of the data pool, there is the risk of a "run on the data pool." Thus, when it comes to a user putting data into the data pool, the user has to be able to "let go" of the data and trade it for a claim into the data pool. That is, the user has to be able to remove his/her association to the data. For example, if a user has a pile of 50 gold, the user needs to have that pile not be associated to with the user in order to give it to the data pool.

When a user requests to move his/her claim over a certain amount of user data quantized value(s) from a first pool to a second pool, the data clearance engine 332 analyzes a variety of internal and external information including, but not limited to, the unclaimed inventory present in the second pool, the claimed inventory present in the second pool, the claimed inventor present in the first pool, the unclaimed inventory present in the first pool, the history of movement requests from the first pool to the second pool, the history of movement requests from the second pool to the first pool, and the like. The data clearance engine 332 may compute an amount of quantized data value(s) that the user may claim from the second pool and may optionally present this as a preview. Moreover, instead of a quantized data value(s) that may be claimed from the second pool, a listing of amounts, attributes, and values of data objects in the virtual world environment instance 352 of the destination system 350 that may be claimed from the second pool may be identified by the data clearance engine 332 and a preview may be provided of these amounts, attributes, value(s), etc. of the data objects.

The user may, if presented with a preview, subsequently cancel the movement operation. If the user was not presented a preview or does not cancel the operation, the user may signal acceptance and the system may proceed with the movement request. If the user proceeds with the movement request, the data clearance engine 332 may associate previous or real-time computed claims into the second pool to the user requesting the move, and at the same time may remove the association the user had to the claims in the first pool that the user specified to move. The claims to the second pool may then be used to create an avatar and its associated objects within the second virtual world environment instance 352 of the destination system 350. In this way, user quantized data value(s) may be migrated from one system 310 to another 350.

Figure 4:
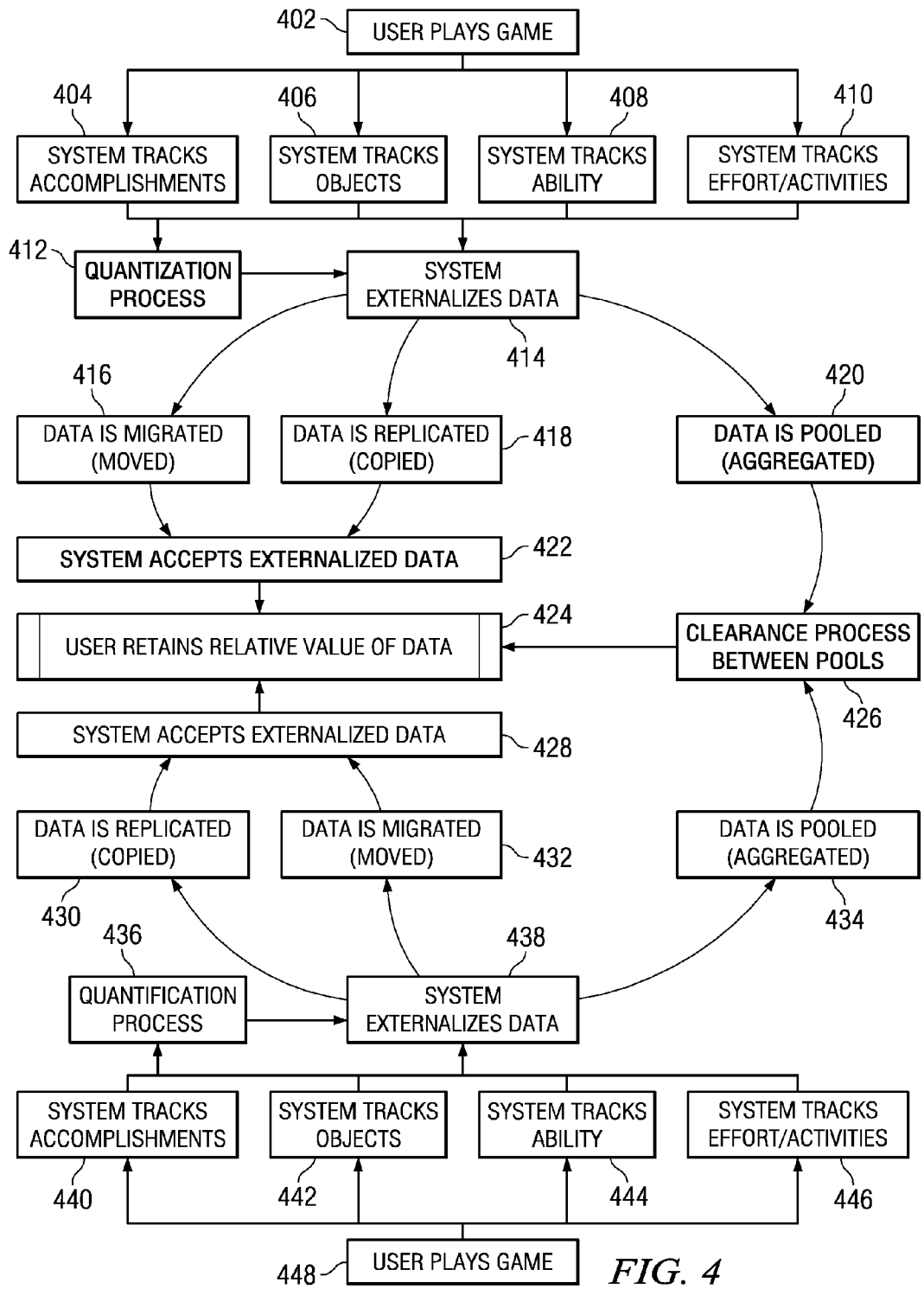
FIG. 4 is an exemplary block diagram providing an overview of a process for quantizing and externalizing a user's perceived value of a virtual world environment avatar in accordance with one illustrative embodiment.

FIG. 4 is an exemplary block diagram providing an overview of a process for quantizing and externalizing a user's perceived value of a virtual world environment avatar in accordance with one illustrative embodiment. The processes shown in FIG. 4 and subsequent figures will be described in terms of game systems that provide virtual world environment instances. Thus, references to "games" in the following descriptions refers to the virtual world environment instances that are provided by "game systems", i.e. computing systems that provide the virtual world environment instances.

As shown in FIG. 4, a first user plays a first game 402 by interacting with the virtual world environment instance using his/her client computing device and software for interfacing with the virtual world environment instance. As part of playing the first game 402, the game system tracks the accomplishments 404, acquired objects 406, abilities 408, and activities 410 associated with the user's avatar. This data may be input to a quantization process 412, such as may be provided by a quantization engine, as well as an externalization process 414, as may be provided by an externalization engine.

The quantization process 412 is a process by which the first game, or an instance of the first game, converts and/or aggregates complex game data into simplified or aggregate quantized data value(s) suitable for externalization. The externalization process 414 is a process by which game data is transmitted within the first game or an instance of the first game. Moreover, the externalization process 414 may transmit game data outside the first game or an instance of the first game. Furthermore, the externalization process 414 may allow game data to be transferred between users of the first game or between users of an instance of the first game.

From this point, two processes are illustrated in parallel, i.e. a data copying/replication and acceptance process, and a data pooling and clearance process. While these three possible paths are shown in parallel in FIG. 4, it should be noted that the process in FIG. 4 uses only one of these paths for a particular transfer of user data from one system to another. The first and second paths are very similar and are on the left hand-side FIG. 4 going through 416 or 418. The third path the data can take is to go though the data pooling and clearance path on the right hand side of FIG. 4. If the user's data is transferred from one system to the next using one of the first two paths, the connection is virtually direct but much less flexible. If the user data is transferred between systems using the third path, then the connection is loosely coupled and much more flexible since the data pooling mechanism creates a layer of abstraction for the virtual world much like a stock exchange provides a level of abstraction between investors and companies.

Using a more direct transfer via one of the first two paths, the externalized data from the externalization process 414 may be provided for acceptance by a second game system through either a data migration process 416 or a data replication process 418. The data replication process 418 is a process of copying the externalized data without altering the original instance of the externalized data. The data migration process 416 is a process of copying the data and subsequently altering the original instance of the externalized data in terms of quantity, quality, and/or association to a particular user.

Alternatively, the user data may be transferred in a more indirect manner using a data pooling process 420. The data pooling process 420 is a process of recording a user's usage or contributions into a pool of data and associating the data pool with a user or group of users. The data pooling process 420 creates a pool of data based on the externalized data and keeps track of the user's claims into the data pool. Moreover, this data pooling process 420 may be applied to a group of users and may track each user's claims into the aggregate pool.

The externalized data that is migrated or copied may be provided to an acceptance process 422, such as provided by an acceptance engine. The acceptance process is a process by which a second game, or an instance of a second game, accepts data originating from a first game or an instance of the first game. This acceptance process may further comprise de-quantizing data received from the first game, or instance of the first game based on user input, de-quantization rules, constraints, and the like. A preview of the results of the de-quantization may be provided and user input received to determine whether to continue on with a movement operation for moving user data quantized value(s) from the first game to the second game or not. As a result, the user retains, within the second game system, the relative value of the user's quantized data value(s) externalized from the first game system 424.

In parallel with the acceptance process, a clearance process 426 may be performed between data pools for the first game and the second game. This clearance process 426 may be a process of altering a user's claims into a first pool of data associated with the first game based on that user's, and/or other user's, claims into a second pool of data for the second game. User input may be obtained, such as via user interfaces associated with previews of the results of the acceptance process, for identifying the alterations to pools that are to be performed as part of the migration process of claims over user data quantized value(s) from the first game's data pool to the second game's data pool.

As shown in FIG. 4, the process of migration may be performed both from the first game system to the second game system, and from the second game system to the first game system, such as via the processes 428-448 which mirror processes 402-426 discussed above. Details of these various processes will not be provided with regard to the following figures.

Figure 5B:
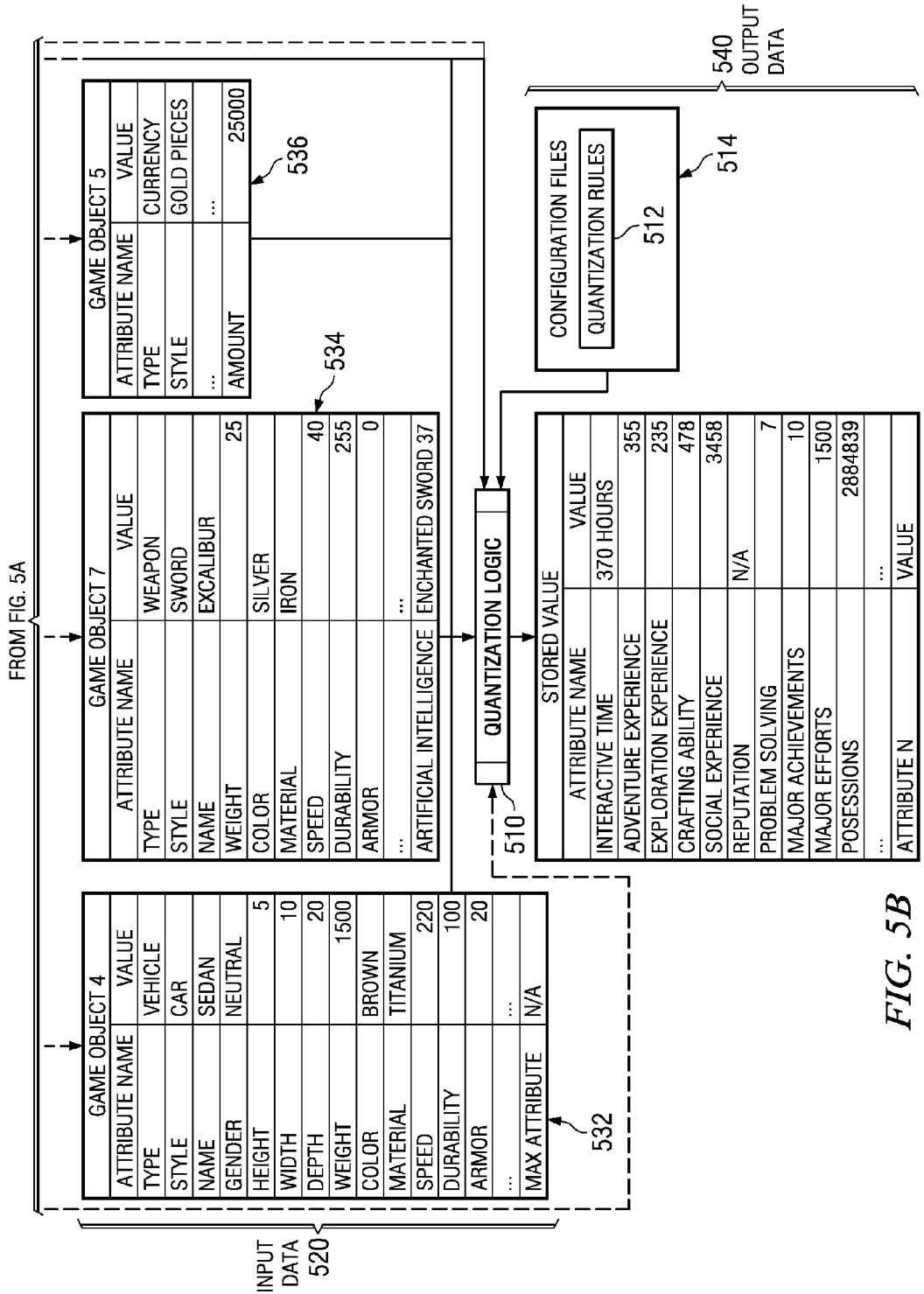

FIGS. 5A and 5B are exemplary diagrams illustrating a quantization process in accordance with one illustrative embodiment. As shown in FIGS. 5A and 5B, the quantization logic 510 may receive as input data 520, a plurality of game objects 522-536. For example, as shown in FIGS. 5A and 5B, a first game has an object 522 that represents the user's account record. This object 522 has properties of type, name, hours played, address, and the like. This object 522 is associated with the other objects 524-536 in a tree like dependency structure. For example, as shown in FIGS. 5A and 5B, additional objects 524 and 526 represent player avatars that have been generated by the user and associated with that user's user record object 522. These objects 524-526 have various properties including object type, race, name, gender, experience, skills, guild standing, etc. Additional objects representing virtual objects in the virtual world environment instance, e.g., clothing objects 528, ammunition objects 530, vehicle objects 532, weapon objects 534, and currency objects 536, among others. Each of these types of objects have different sets of properties, although some properties may be universal to all objects, such as type and name.

Each of the properties of the data objects 522-536 may have associated values, as shown. These properties and values may be operated on by the quantization logic 510 to generate output data 540 having a plurality of quantized values. While the output data 540 is shown as having a plurality of quantized values, in other illustrative embodiments a single quantized value may be generated. The quantization logic 510 may operate based on quantization rules 512 provided as part of one or more configuration files or data structures 514 configuring the quantization logic 510 for the specific source of the input data 520 and the types of objects in the input data 520.

As shown in FIGS. 5A and 5B, the various objects 522-536 and their properties are quantized into a set of output values for various categories of user record associated objects and properties. For example, the quantized output values may comprise values for interactive time, adventure experience, exploration experience, crafting ability, social experience, reputation, problem solving, major achievements, major efforts, possessions, etc. The quantization logic 510 takes as input the user's actions in real time or stored as game objects and uses a variety of pre-defined an interactive processes, rules, and parameters to quantify the relative contribution of a user's activities. The quantization logic 510 stores the results of these calculations and may continually update them as the game is played. Alternatively, the quantization logic 510 may take these actions or objects as input, store the results of its calculations and destroy the original objects.

The quantization process performed by the quantization logic 510 is not reversible without human intervention. That is, the quantization process makes no effort to retain the "look and feel" of any game object and the quantized value(s) cannot be converted back into the objects 522-536 of the input data 520 without user intervention. The quantization process is designed to assert the value of the input parameters and produce an output that correlates to these values.

Figure 6:
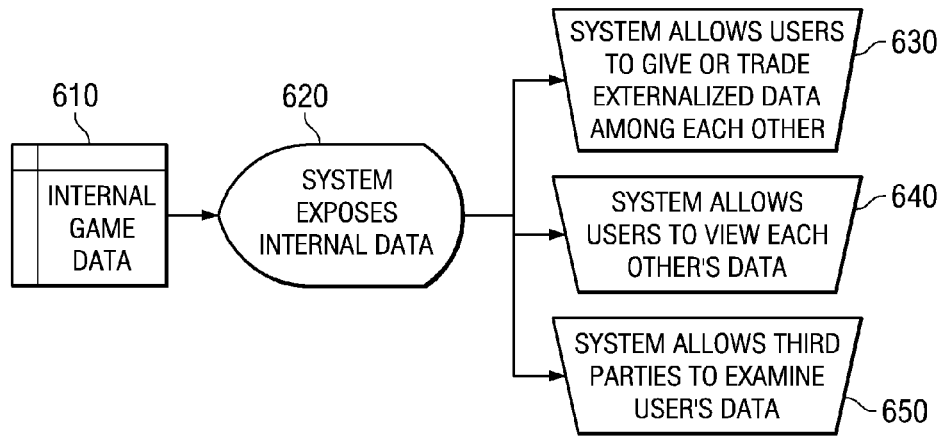
FIG. 6 is an exemplary diagram illustrating an externalization operation in accordance with one illustrative embodiment.

FIG. 6 is an exemplary diagram illustrating an externalization operation in accordance with one illustrative embodiment. As shown in FIG. 6, internal game data 610 is input to the externalization engine which exposes 620 the internal data 610, e.g., by making the internal data available for access such as by providing via a web page or web service. Through this exposing of the internal data 610, the externalization engine allows a user to give or trade the externalize data with other users 630. Moreover, the externalization engine allows users to view each other's internal data 640. Furthermore, the externalization engine allows third parties to examine the user's internal data 650. Various interfaces may be provided by the externalization engine for facilitating these processes of transfer and viewing of the internal data 610.

Figure 7A:
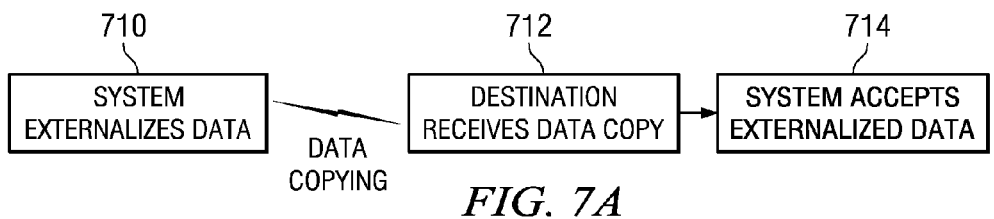
FIGS. 7A and 7B are exemplary diagrams illustrating data acceptance operations in accordance with one illustrative embodiment.
Figure 7B:
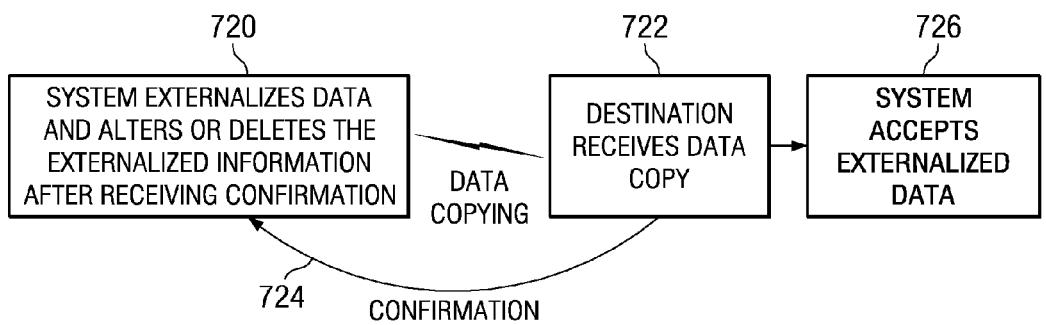

FIGS. 7A and 7B are exemplary diagrams illustrating data acceptance operations in accordance with one illustrative embodiment. It should be appreciated that, depending upon the particular implementation chosen, either a data replication or data migration may be used to accept the externalized data into a new gaming environment. FIG. 7A shows an implementation in which data replication is performed. FIG. 7B shows an implementation in which data migration is performed.

As shown in FIG. 7A, the source system may quantize data objects into quantized value(s) that are externalized by an externalization engine to form externalized data 710. The externalized data is copied over to the destination system 712. The destination system then performs acceptance processing 714 on the copied over data. This acceptance processing 714 may be performed, for example, by an acceptance engine and may be done without transformation of the data, such as when data is being moved from one instance of a game to another instance of the same game, or after a translation of the externalized data into data that may be internalized into the destination game system, such as by way of a de-quantization process.

Similarly, as shown in FIG. 7B, the source system may quantize data objects into quantized value(s) that are externalized by an externalization engine to form externalized data 720. The externalized data is copied over to the destination system 722. The destination system may return a confirmation to the source system indicating that the externalized data was received at the destination system 724. In response to receiving this confirmation, the source system may delete the externalized data. The destination system may perform acceptance processing 726 on the copied over data. This acceptance processing 726 may be performed, for example, by an acceptance engine and may be done without transformation of the data, such as when data is being moved from one instance of a game to another instance of the same game, or after a translation of the externalized data into data that may be internalized into the destination game system, such as by way of a de-quantization process.

Figure 8B:
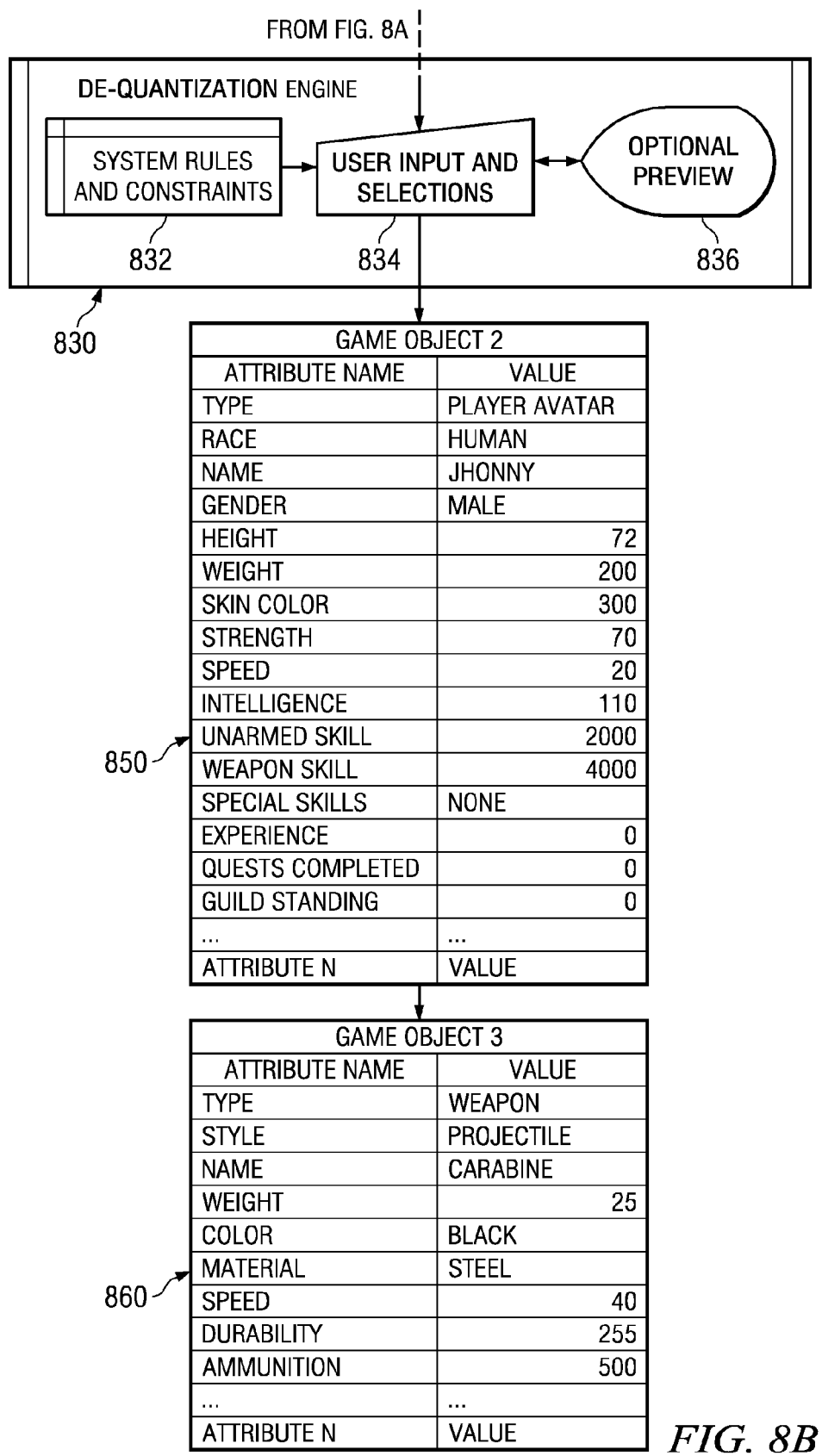

FIGS. 8A and 8B are exemplary diagrams illustrating a de-quantization operation in accordance with one illustrative embodiment. As shown in FIGS. 8A and 8B, one or more game objects 810 associated with a user are converted to one or more quantized values 820 representing the game objects 810. It is important to note that the stored one or more quantized values 820 do not retain any information regarding the look and feel or specific game objects or their properties. Rather, the stored one or more quantized values 820 are an abstraction and aggregation of perceived value of these game objects and properties from the view point of the user and the originating game environment.

The stored one or more quantized values 820 may be directly input to the de-quantization engine 830, or alternatively may undergo a translation/exchange operation 840 via a data pooling mechanism or the externalization process. That is, there may be an intermediate state when quantized data is still on the sending or source system, in a format understood by the sending or source system, and it is either put into a data pool and remains in association with the sending or source system forever (and what gets swapped around are claims to the data) or it is converted from the native format into a portable one. A translation/exchange operation 840 may be used, for example, when different game systems track values differently, or even different subsystems within the same game track values differently. In such a situation, there may be a need to use a pooling system as in FIG. 3, elements 330-332, or evaluate the source data values and perform a translation, transformation, or further valuation process to generate transformed quantized values 845 before proceeding to the de-quantization engine 830.

The stored one or more quantized data values 820 or 845 are input to the de-quantization engine 830 which operates on these data values 820, 845 using system rules and constraints 832 and user input and selections 834. The de-quantization engine 830, or an internalization engine that encompasses the de-quantization engine 830, may provide an optional preview 836 of the results of the de-quantization operation performed by the de-quantization engine 830 based on the particular user inputs, selections, and system rules and constraints. The user may then choose to either continue on with the de-quantization operation, abort the de-quantization operation, or modify user inputs and selections and obtain a new preview 836. The original stored one or more quantized values 820, 845 may be retained during this de-quantization operation or may be "expended" completely or partially during the de-quantization operation such that the original stored one or more quantized values 820, 845 are no longer obtainable from the de-quantized values or game objects generated as a result of the de-quantization operation.

The de-quantization operation, in one illustrative embodiment, generates one or more game objects 850-860 for another game environment instance. In creating these game objects 850-860, the de-quantization engine 830 uses the user directives, via the user input, along with the system rules, constraints, etc., to arrive at a selected game object 850-860. For example, the de-quantization engine 830 may provide a series of user interface previews 836 that identify the available game objects 850-860 corresponding to the various stored one or more quantized values 820, 845. Thus, for example, for a quantized value corresponding to a property of adventure experience, exploration experience, and crafting ability, various points for assigning to a set of properties of a player avatar object 850 may be provided such that the user may input his/her selection of a distribution of these points to the set of properties for the player avatar object 850. Similarly, based on a quantized value for a "possessions" property, a set of possible possession objects may be presented to the user, via a user interface preview 836, through which the user may select which possessions his/her new player avatar 850 will have in the new game environment. In the depicted example, the user has selected a weapon object 860 corresponding to a carabine having the identified properties. As a user selects objects from the user interface previews 836, the available portion of the quantized values may be dynamically adjusted to reflect a lower available value for use in obtaining additional objects.

Through this interactive process, the user is able to convert their one or more quantized values for their representation in the first game environment, into a user representation in the second game environment, e.g., an avatar and associated game objects in the first game environment to an avatar and associated game objects in the second game environment. In this way, the user has a perceived value associated with the new avatar and its objects immediately upon creation that somewhat reflects the value associated with the previous avatar in the first game environment. Moreover, this process allows a user to select different properties for their new avatar and game objects for their new avatar that may be very different from that of the avatar and objects in the first game environment. For example, the first game environment may be based on a medieval fantasy world environment in which weapons are of the sword, axe, bow, etc. type. The second game environment may be a post-apocalypse world environment in which weapons are of the pistol, rifle, missile, grenade, etc. type. The user interactive de-quantization process allows a user to provide their input as to how to resolve this difference in game environments.

Figure 9A:
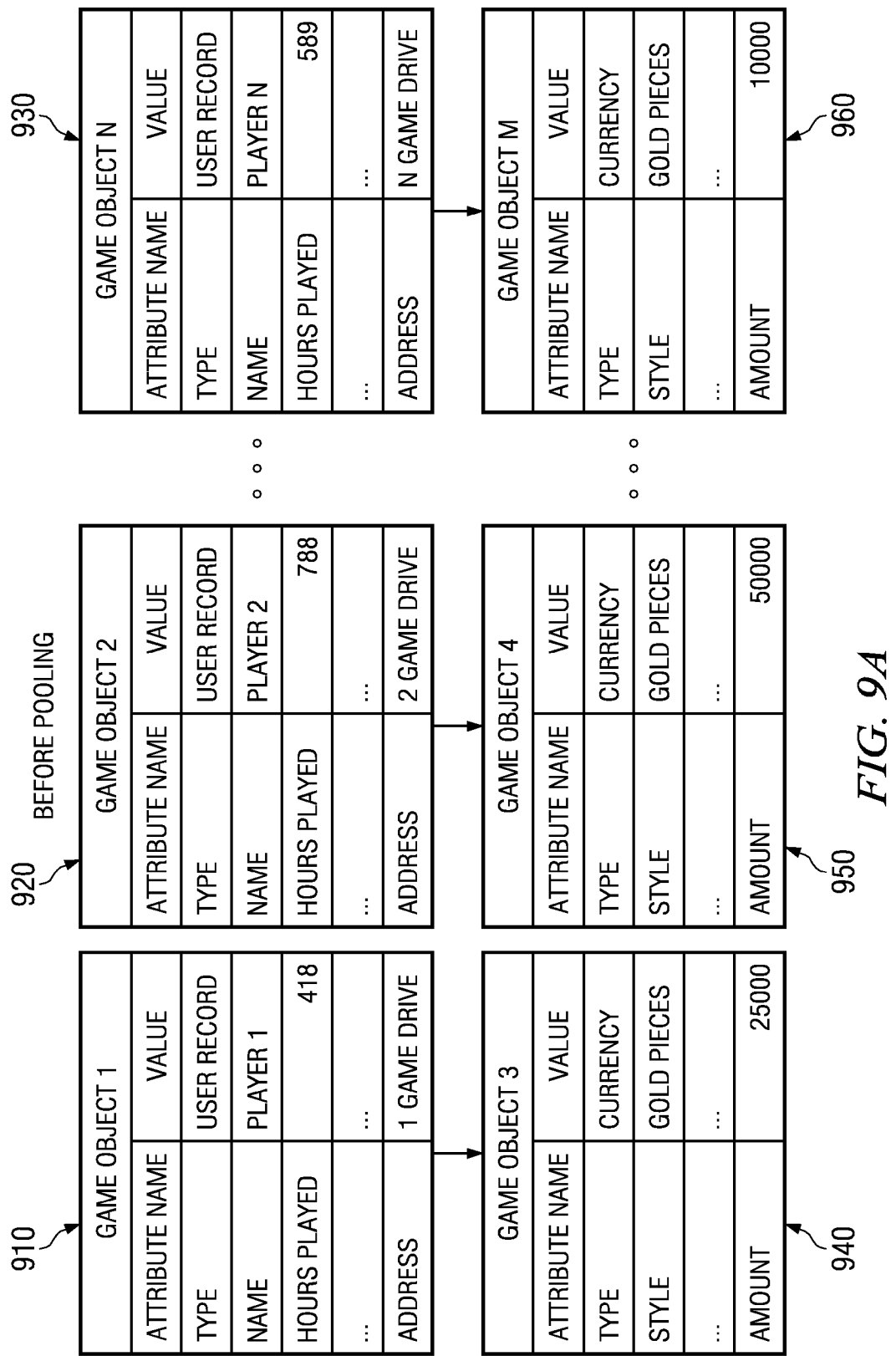
FIGS. 9A and 9B are exemplary diagrams illustrating a data pooling operation in accordance with one illustrative embodiment.
Figure 9B:
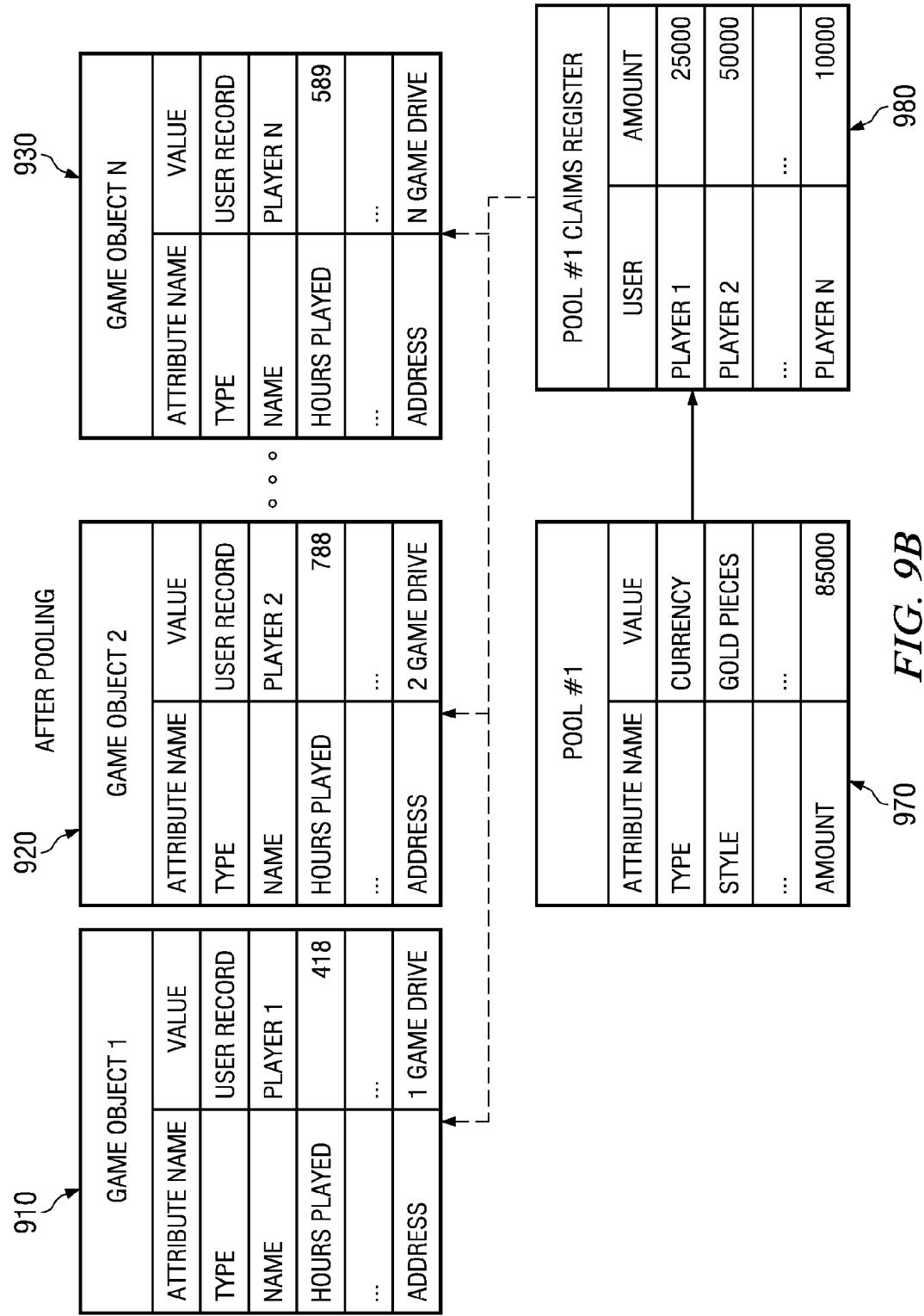

FIGS. 9A and 9B are exemplary diagrams illustrating a data pooling operation in accordance with one illustrative embodiment. FIG. 9A illustrates user records before data pooling. FIG. 9B illustrates user records after data pooling. As shown in FIG. 9A, before data pooling, each user record 910-930 has a varying number of game data objects 940-960. As shown in FIG. 9B, after data pooling, the users may still posses some data objects and attributes or properties associated with them, but they have also grouped some of their data objects and attributes into a repository or data pool 970. This data pool 970 maintains a record of what, when, and where a user contributed to the data pool 970. These grouped data objects and attributes can have claims against them. These claims are tracked using a data pool claim register 980.

In the depicted example, currency game objects are pooled from each of the user records 910-930. The claims register 980 illustrates how much each player contributed to the currency game object, e.g., player 1 contributed 25,000 gold pieces, player 2 contributed 50,000 gold pieces, and player N contributed 10,000 gold pieces. Other examples of game objects or attributes that may be pooled into a data pool include experience, hours played, social standing, or even collections of attributes such as characters, user accounts, items, etc. The purpose of data pooling is to enable migration among systems that cannot or will not be tightly coupled. Data pooling insulates the virtual world environment instance of one system from other virtual world environment instances by a layer of abstraction that expands and contracts based on two-way demand. Data pooling is not just about collecting objects together, but also provides an ability to track user claims against that data so that a user can get out what data the user put into the data pool. If using a data pool, the migration of data from one place to another does not actually happen, but instead the claims against this data are being swapped around inside the data pooling system. Once the pool swaps the claims around, the user can go into the destination virtual world environment instance system and claim from the destination's data pool whatever the exchange gave him on his destination pool. The critical thing here is that there is a register of who has what stake on each data pool.

Figure 10A:
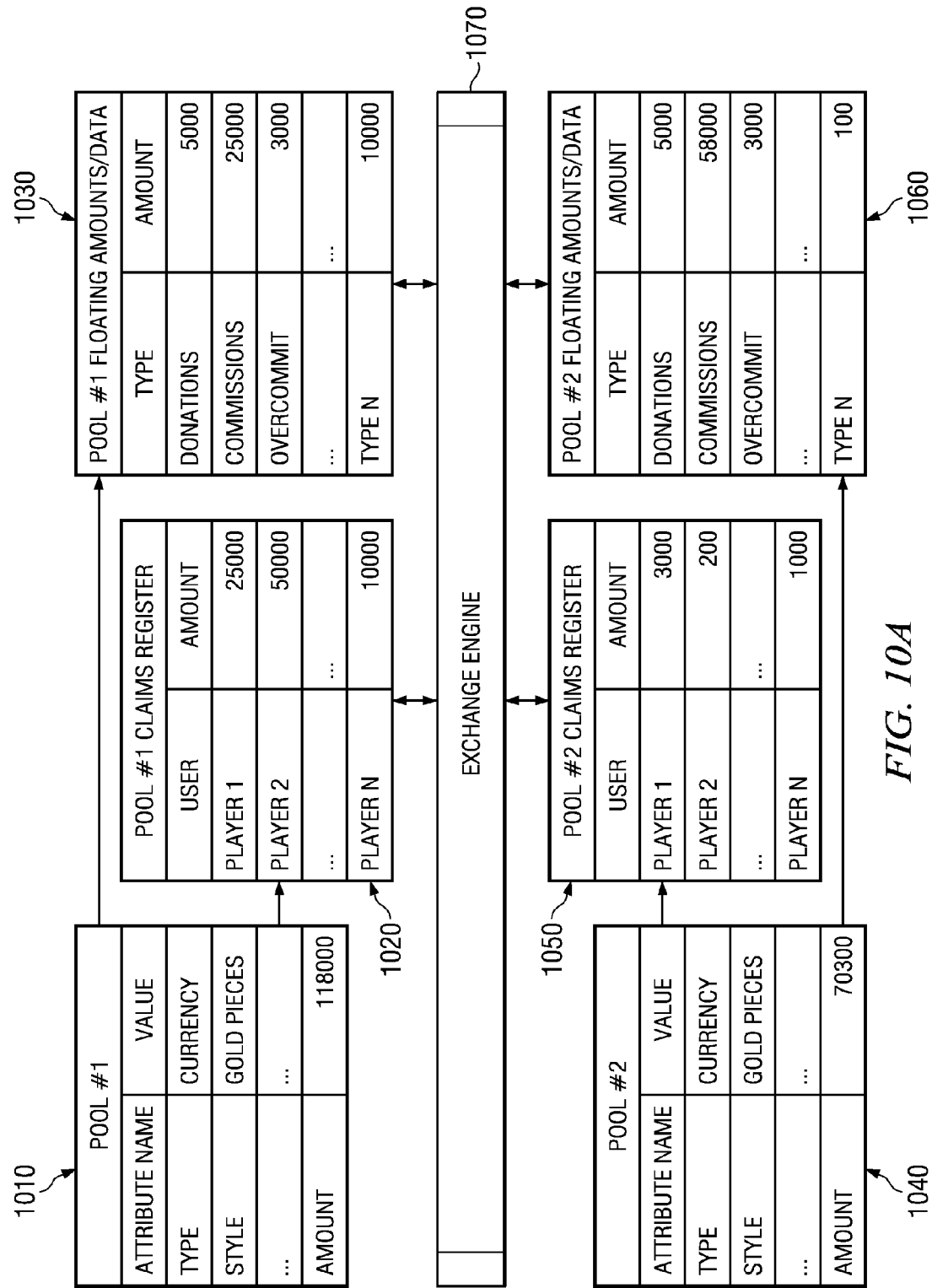
FIGS. 10A and 10B are exemplary diagrams illustrating a clearance operation in accordance with one illustrative embodiment.
Figure 10B:
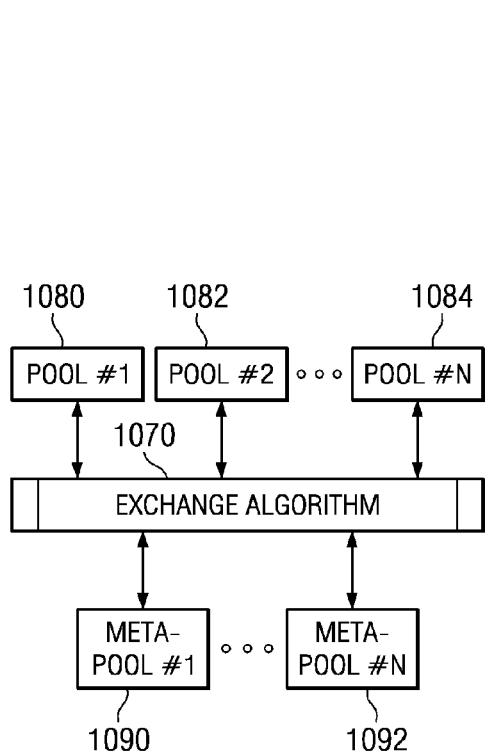

FIGS. 10A and 10B are exemplary diagrams illustrating a clearance operation in accordance with one illustrative embodiment. As shown in FIG. 10A shows a clearance process between two data pools. FIG. 10B illustrates a clearance process between any number of data pools and/or meta-pools. As shown in FIG. 10A, a first data pool 1010 has an associated claims register 1020 and a floating amounts data structure 1030. A second data pool 1040 has similar associated claims register 1050 and floating amounts data structure 1060. The claims registers 1020, 1050 and floating amounts data structures 1030, 1060 are accessible by an exchange engine 1070. The exchange engine 1070 uses a complex algorithm to determine rates, commissions, etc. based on available inventory, claimed inventory, transaction history, etc.

It is important to note that the pool clearance mechanism overcomes the problem of having each data pool trapped within a particular game system. While the data objects themselves, and their associated values, may be trapped within their respective game systems, the problem of immobility is overcome by shifting claims from one claims register 1020, 1050 based on the available floating amounts in the floating amounts data structures 1030, 1060. That is, the actual data objects never move from one game system to another, but the user claims over these data objects gain mobility by being pooled and exchanging their claims with the floating values or data. The floating values or data, i.e. owned by the system, overcommitted, or otherwise unclaimed, provide the mobility for moving claims from one game system to another. The floating values in effect balance the influx of users into a system with the outflux as well as maintains the economy established within the virtual world environment instance so that the influx of new users into the virtual world environment instance does not result in a large imbalance in the availability and number of objects present within the virtual world environment instance. The floating values are preferably maintained at a level to avoid such negative affects to allowing migration of users into the virtual world environment instance.

FIG. 10B illustrates a number of different data pools 1080-1084 and meta-pools 1090-1092 that all may make use of the exchange engine 1070. Each of the data pools 1080-1084 may comprise records associating a user to a set of claims over a present or future inventor of data resources. Each data pool 1080-1084 also tracks values of what it considers to be "floating" inventory which enables movement of claims between data pools. The meta-pools 1090-1092 may contain a combination of claims and inventory over many different already existing data pools. The same principles described above with regard to FIG. 10A for a clearance process between two data pools applies to the multiple data pool and meta-pool implementation shown in FIG. 10B.

Figure 11:
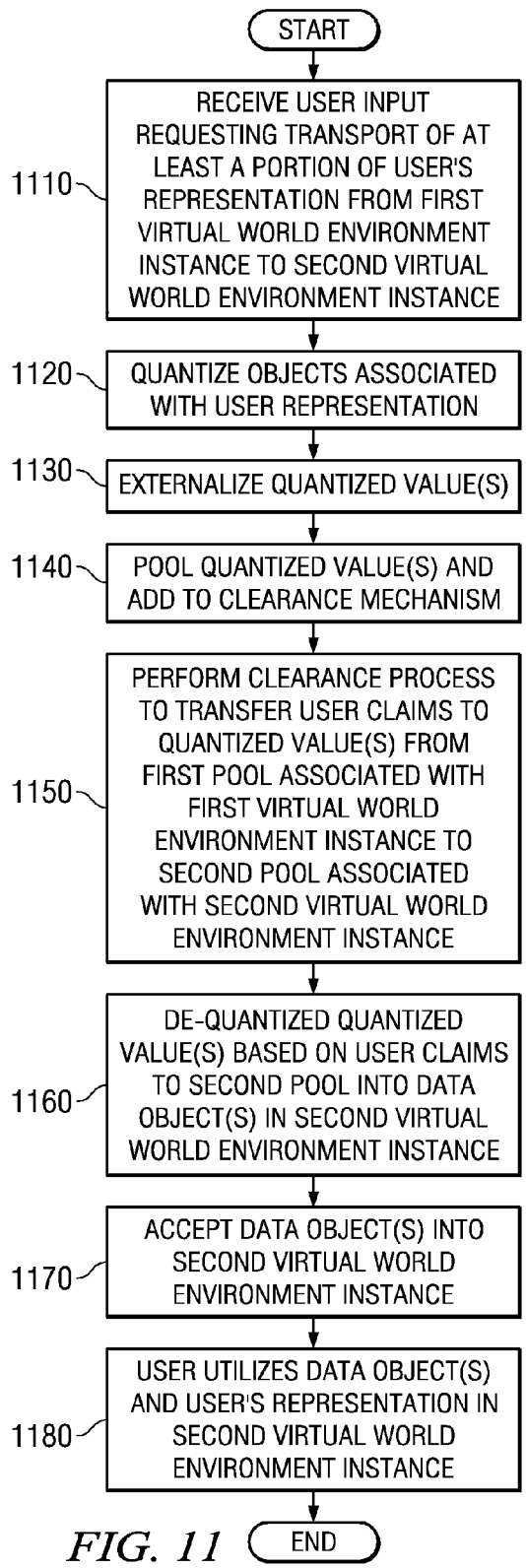
FIG. 11 is a flowchart outlining an overall operation for transporting a user's perceived value of a user representation in a first virtual world environment instance to a second virtual world environment instance in accordance with one illustrative embodiment.

FIG. 11 is a flowchart outlining an overall operation for transporting a user's perceived value of a user representation in a first virtual world environment instance to a second virtual world environment instance in accordance with one illustrative embodiment. As shown in FIG. 11, the operation starts with receiving a user input requesting a transport of at least a portion of a user's representation within a first virtual world environment instance to a second virtual world environment instance (step 1110). The objects associated with the user's representation within the first virtual world environment instance are quantized into one or more quantized values (step 1120). The quantized values are externalized (step 1130) and optionally pooled and added to a clearing house or clearance mechanism (step 1140). A clearance process is performed to transfer user claims to quantized values from a first pool associated with the user in the first virtual world environment instance into user claims to quantized values of a second pool associated with the second virtual world environment instance (step 1150). The user's claims in the second pool are then used to de-quantize the one or more quantized values into one or more data objects in the second virtual world environment instance (step 1160). These one or more data objects in the second virtual world environment instances are then accepted into the second virtual world environment instance system (step 1170). Thereafter, the user may utilize these one or more data objects to interact with the second virtual world environment instance (step 1180).

Figure 12:
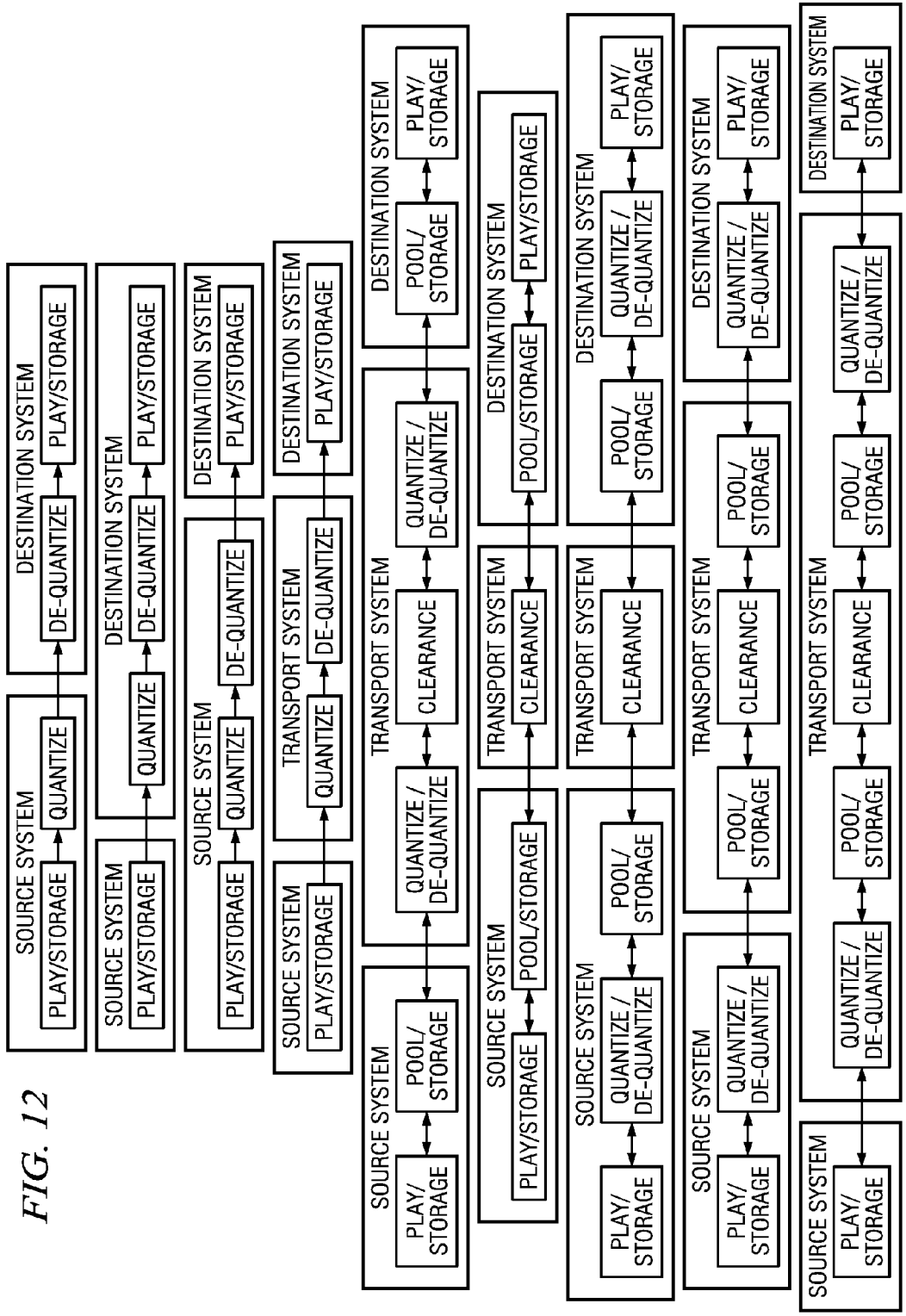
FIG. 12 is an exemplary diagram of alternative configurations of elements of a transport mechanism in accordance with illustrative embodiments of the present invention.

FIG. 12 is an exemplary diagram of alternative configurations of elements of a transport mechanism in accordance with illustrative embodiments of the present invention. There are literally hundreds of configurations that may be used to provide the same functionality and results as that described above with regard to the configuration shown in FIG. 3. Some of the main alternative configurations for the elements of the transport mechanism 320 are illustrated in FIG. 12. Thus, FIG. 12 illustrates the versatility of configuration of the illustrative embodiments.

Thus, the illustrative embodiments provide mechanisms for enabling the transport of a user's perceived value of the user's representation, e.g., avatar and associated objects, in a first virtual world environment instance to a second virtual world environment instance. Mechanisms are provided for facilitating the transportation of relative value, rather than objects themselves, between virtual world environment instances so that virtual world environment instances of different types may allow migration of users between these virtual world environment instances. Mechanisms are provided for safeguarding the economies and balance of objects within these virtual world environment instances while still allowing such migration of users. Moreover, mechanisms are provided for data pooling and clearance operations so as to facilitate such migration.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for transferring a value associated with a representation of a user in a first virtual world environment instance to a second virtual world environment instance, comprising:

receiving, in a transport computing device of the data processing system, a request to transport a first representation of the user from the first virtual world environment instance, provided on a source computing system of the data processing system, to the second virtual world environment instance provided on a target computing system;

quantizing, by the transport computing device, in response to receiving the request, one or more data objects representing equipment or items within the first virtual world environment associated with a first representation of the user in the first virtual world environment instance, and one or more non-equipment or non-item type characteristics defining traits or abilities of a first character represented by the first representation of the user in the first virtual world environment instances, into a single quantized value;

transporting, by the transport computing device, the quantized value to the second virtual world environment instance on the second computing system; and converting, by the transport computing system, the quantized value into a second representation of the user in the second virtual world environment instance, the second representation of the user being different from the first representation of the user in the first virtual world environment, wherein the first representation of the user in the first virtual world environment instance ceases to exist in the first virtual world environment instance in response to completion of the transporting of the at least one quantized value into the second virtual world environment instance, and wherein converting the quantized value into the second representation comprises spending, in accordance with a user selection, at least a first portion of the quantized value, less than the total quantized value, to purchase at least one non-equipment type or non-item type characteristic defining a trait or ability of a second character represented by the second representation.

2. The method of claim 1, wherein the quantized value does not maintain a correspondence between the quantized value and the one or more data objects, and the one or more non-equipment or non-item type characteristics, such that the one or more data objects and one or more non-equipment or non-item type characteristics cannot be automatically generated based on the quantized value.

3. The method of claim 1, wherein converting the quantized value into a second representation of the user comprises:

converting the quantized value to a format readable by a system providing the second virtual world environment; and de-quantizing a second portion of the quantized value into one or more objects, within the second virtual world environment, associated with the second representation of the user.

4. The method of claim 3, wherein de-quantizing the second portion of the quantized value comprises receiving user input, utilizing system rules associated with the system providing the second virtual world environment instance, and system constraints associated with the system providing the second virtual world environment instance, to interactively assist a user with spending the second portion of the quantized value to create the second representation of the user within the second virtual world environment instance.

5. The method of claim 1, wherein converting the quantized value into a second representation of the user in the second virtual world environment instance comprises presenting the user with interactive previews of the actions to be performed to convert portions of the quantized value into one or more objects, attributes of objects, equipment or items, or one or more non-equipment and non-item type characteristics of the second character in the second virtual world environment instance that are to be associated with the second representation of the user.

6. The method of claim 1, further comprising:

pooling the quantized value in a first data pool associated with the first virtual world environment instance;

recording the quantized value in association with an identity of the user; and associating a first claim by the user to a first portion of the first data pool based on the quantized value.

7. The method of claim 6, further comprising:

receiving a request to exchange the first claim for a second claim to a second portion of a second data pool associated with the second virtual world environment instance; and providing the second claim to a second portion of the second data pool associated with the second virtual world environment instance in response to receiving the request.

8. The method of claim 7, wherein, following providing the second claim to the second portion, the first claim represents unclaimed inventory in the first data pool and the second claim represents an over commitment of the second data pool.

9. The method of claim 7, wherein providing the second claim comprises:

analyzing at least one of, unclaimed inventory present in the second data pool, claimed inventory present in the second data pool, claimed inventory present in the first data pool, unclaimed inventory present in the first data pool, a history of movement requests from the first data pool to the second data pool, and a history of movement requests from the second data pool to the first data pool;

computing an amount of quantized values that the user may claim from the second data pool based on results of the analysis; and providing the second claim based on the computed amount of quantized values in the second data pool.

10. The method of claim 9, further comprising:

presenting the user with a preview of the amount of quantized values that the user may claim;

requesting that the user confirm the user's desire to exchange their first claim from the first data pool for the second claim to the second data pool; and either providing the second claim or canceling the exchange in response to a user input in response to the request.

11. The method of claim 10, further comprising:

providing a user interface through which the user may create an avatar and associate objects and attributes to the avatar in the second virtual world environment instance based on the second claim.

12. The method of claim 1, wherein the first virtual world environment instance and the second virtual world environment instance are both massively multiplayer online (MMO) game environments, and wherein the MMO game environments are different from one another.

13. A computer program product comprising a computer readable storage medium having a computer readable program stored thereon, wherein the computer readable program, when executed on a computing device, causes the computing device to:

receive a request to transport a first representation of the user from the first virtual world environment instance provided on a first computing system to the second virtual world environment instance provided on a second computing system;

quantize, in response to receiving the request, one or more data objects representing equipment or items within the first virtual world environment associated with a first representation of the user in the first virtual world environment instance, and one or more non-equipment or non-item type characteristics defining traits or abilities of a first character represented by the first representation of the user in the first virtual world environment instances, into a single quantized value;

transport the quantized value to the second virtual world environment instance; and convert the quantized value into a second representation of the user in the second virtual world environment instance, the second representation of the user being different from the first representation of the user in the first virtual world environment, wherein the first representation of the user in the first virtual world environment instance ceases to exist in the first virtual world environment instance in response to completion of the transport of the quantized value into the second virtual world environment instance, and wherein converting the quantized value into the second representation comprises spending, in accordance with a user selection, at least a first portion of the quantized value, less than the total quantized value, to purchase at least one non-equipment type characteristic defining a trait or ability of a second character represented by the second representation.

14. The computer program product of claim 13, wherein the quantized value does not maintain a correspondence between the quantized value and the one or more data objects, and the one or more non-equipment or non-item type characteristics, such that the one or more data objects and one or more non-equipment or non-item type characteristics cannot be automatically generated based on the quantized value.

15. The computer program product of claim 13, wherein the computer readable program causes the computing device to convert the at least one quantized value into a second representation of the user by:

converting the quantized value to a format readable by a system providing the second virtual world environment; and de-quantizing a second portion of the quantized value into one or more objects, within the second virtual world environment, associated with the second representation of the user.

16. The computer program product of claim 15, wherein the computer readable program causes the computing device to de-quantize the second portion of the quantized value by receiving user input, utilizing system rules associated with the system providing the second virtual world environment instance, and system constraints associated with the system providing the second virtual world environment instance, to interactively assist a user with spending the second portion of the quantized value to create the second representation of the user within the second virtual world environment instance.

17. The computer program product of claim 13, wherein the computer readable program causes the computing device to convert the quantized value into a second representation of the user in the second virtual world environment instance by presenting the user with interactive previews of the actions to be performed to convert portions of the quantized value into one or more objects, attributes of objects, equipment or items, or one or more non-equipment and non-item type characteristics of the second character in the second virtual world environment instance that are to be associated with the second representation of the user.

18. The computer program product of claim 13, wherein the computer readable program further causes the computing device to:

pool the quantized value in a first data pool associated with the first virtual world environment instance;

record the quantized value in association with an identity of the user; and associate a first claim by the user to a first portion of the first data pool based on the quantized value.

19. The computer program product of claim 18, wherein the computer readable program further causes the computing device to:

receive a request to exchange the first claim for a second claim to a second portion of a second data pool associated with the second virtual world environment instance; and provide the second claim to a second portion of the second data pool associated with the second virtual world environment instance in response to receiving the request.

20. The computer program product of claim 19, wherein, following providing the second claim to the second portion, the first claim represents unclaimed inventory in the first data pool and the second claim represents an over commitment of the second data pool.

21. The computer program product of claim 19, wherein the computer readable program causes the computing device to provide the second claim by:

analyzing at least one of, unclaimed inventory present in the second data pool, claimed inventory present in the second data pool, claimed inventory present in the first data pool, unclaimed inventory present in the first data pool, a history of movement requests from the first data pool to the second data pool, and a history of movement requests from the second data pool to the first data pool;

computing an amount of quantized values that the user may claim from the second data pool based on results of the analysis; and providing the second claim based on the computed amount of quantized values in the second data pool.

22. The computer program product of claim 21, wherein the computer readable program further causes the computing device to:

present the user with a preview of the amount of quantized values that the user may claim;

request that the user confirm the user's desire to exchange their first claim from the first data pool for the second claim to the second data pool; and either provide the second claim or cancel the exchange in response to a user input in response to the request.

23. The computer program product of claim 22, wherein the computer readable program further causes the computing device to:

provide a user interface through which the user may create an avatar and associate objects and attributes to the avatar in the second virtual world environment instance based on the second claim.

24. The computer program product of claim 13, wherein the first virtual world environment instance and the second virtual world environment instance are both massively multiplayer online (MMO) game environments, and wherein the MMO game environments are different from one another.

25. An apparatus, comprising:
a processor; and
a memory coupled to the processor, wherein the memory comprises instructions which, when executed by the processor, cause the processor to:
receive a request to transport a first representation of the user from a first virtual world environment instance provided on a first computing system to a second virtual world environment instance provided on a second computing system;
quantize, in response to receiving the request, one or more data objects representing equipment or items within the first virtual world environment associated with a first representation of the user in the first virtual world environment instance, and one or more non-equipment or non-item type characteristics defining traits or abilities of a first character represented by the first representation of the user in the first virtual world environment instances, into a single quantized value;
transport the quantized value to the second virtual world environment instance; and
convert the quantized value into a second representation of the user in the second virtual world environment instance, the second representation of the user being different from the first representation of the user in the first virtual world environment, wherein the first representation of the user in the first virtual world environment instance ceases to exist in the first virtual world environment instance in response to completion of the transport of the quantized value into the second virtual world environment instance, and wherein converting the quantized value into the second representation comprises spending, in accordance with a user selection, at least a portion of the quantized value, less than the total quantized value, to purchase at least one non-equipment type characteristic defining a trait or ability of a second character represented by the second presentation.

* * * * *